US010524496B2

(12) United States Patent
Hensel et al.

(10) Patent No.: US 10,524,496 B2
(45) Date of Patent: Jan. 7, 2020

(54) FRUIT AND VEGETABLE JUICER

(71) Applicant: BREVILLE PTY LIMITED, Alexandria, New South Wales (AU)

(72) Inventors: Keith James Hensel; Nicholas Edmonds, Curl Curl (AU); Khon Thai, Campsie (AU); Samuel Adeloju, Randwick (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 136 days.

(21) Appl. No.: 15/022,205

(22) PCT Filed: Sep. 17, 2014

(86) PCT No.: PCT/AU2014/000916
§ 371 (c)(1),
(2) Date: Mar. 15, 2016

(87) PCT Pub. No.: WO2015/039166
PCT Pub. Date: Mar. 26, 2015

(65) Prior Publication Data
US 2016/0219923 A1  Aug. 4, 2016

(30) Foreign Application Priority Data
Sep. 17, 2013 (AU) ................................ 2013903578

(51) Int. Cl.
*A23N 1/02* (2006.01)
*A47J 19/02* (2006.01)
*A47J 19/06* (2006.01)

(52) U.S. Cl.
CPC .............. *A23N 1/02* (2013.01); *A47J 19/027* (2013.01); *A47J 19/06* (2013.01)

(58) Field of Classification Search
CPC ............ A23N 1/02; A47J 19/027; A47J 19/06
(Continued)

(56) References Cited

U.S. PATENT DOCUMENTS 2,280,214 A * 4/1942 Buerk ................... A47J 19/027
210/173
2,527,695 A * 10/1950 Bennett ................. A47J 19/027
99/511
(Continued)

FOREIGN PATENT DOCUMENTS

CN 201205196 Y 3/2009
CN 201353096 Y 12/2009
(Continued)

OTHER PUBLICATIONS

International Search Report and Written Opinion for PCT/AU2014/000916, dated Oct. 20, 2014.
(Continued)

*Primary Examiner* — Phuong T Nguyen
(74) *Attorney, Agent, or Firm* — Marshall, Gerstein & Borun LLP

(57) ABSTRACT

A fruit and vegetable juicing device having a feed tube, a juice collector and a grating disc carrying a frusto-conical sieve, the grating disc having a first array of grating teeth, a secondary processing surface with a second array of grating teeth; each tooth having one leading edge and one trailing edge, wherein the juice collector has either an internal helical ramp with an elevated discharge nozzle or a circumferential trough having a lowest point that leads to a discharge nozzle.

21 Claims, 34 Drawing Sheets

(58) Field of Classification Search
USPC ......... 99/484, 486, 489, 492, 495, 509, 510, 99/511, 513
See application file for complete search history.

(56) References Cited

U.S. PATENT DOCUMENTS

| | | | |
|---|---|---|---|
| 2,971,550 A | 2/1961 | Leo Henzirohs | |
| 2,995,165 A * | 8/1961 | Menne .................... | A23N 1/00 99/511 |
| 8,316,762 B2 * | 11/2012 | Peng ........................ | A47J 19/02 241/37.5 |
| 2006/0000327 A1 | 1/2006 | Lin | |
| 2006/0186240 A1 * | 8/2006 | Schuller ................ | D01G 15/88 241/294 |

FOREIGN PATENT DOCUMENTS

| | | |
|---|---|---|
| CN | 201630946 | 11/2010 |
| CN | 201641527 U | 11/2010 |
| CN | 201939077 | 8/2011 |
| JP | S5576619 A | 6/1980 |
| TW | 200803781 A | 1/2008 |
| WO | WO-2013/020179 A1 | 2/2013 |

OTHER PUBLICATIONS

International Preliminary Report on Patentability for PCT/AU2014/000916, dated Mar. 22, 2016.
Extended European Search Report for European Patent Application No. 14846631, dated Apr. 12, 2017.
First Office Action for Chinese Patent Application No. 201480062701.6, dated Mar. 1, 2017.
Second Office Action for Chinese Patent Application No. 201480062701.6, dated Jul. 27, 2017.
Third Office Action for Chinese Patent Application No. 201480062701.6, dated Jan. 31, 2018.
Office Action for European Patent Application No. 14846631.1, dated May 18, 2018.
Office Action for European Patent Application No. 14 846 631.1, dated Mar. 25, 2019.
Examination Report for Australian Application No. 2014324069, dated Oct. 9, 2019.

* cited by examiner

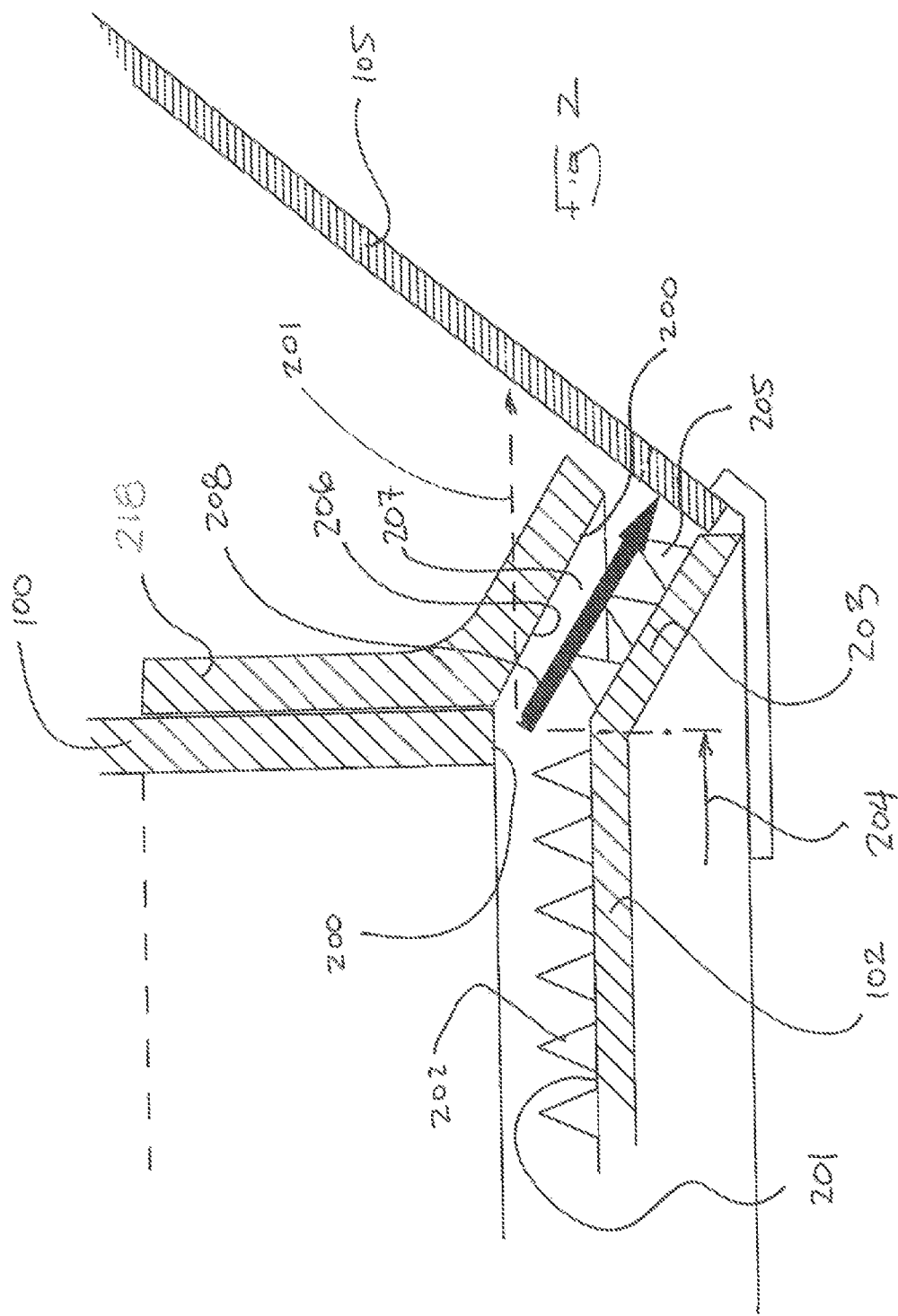

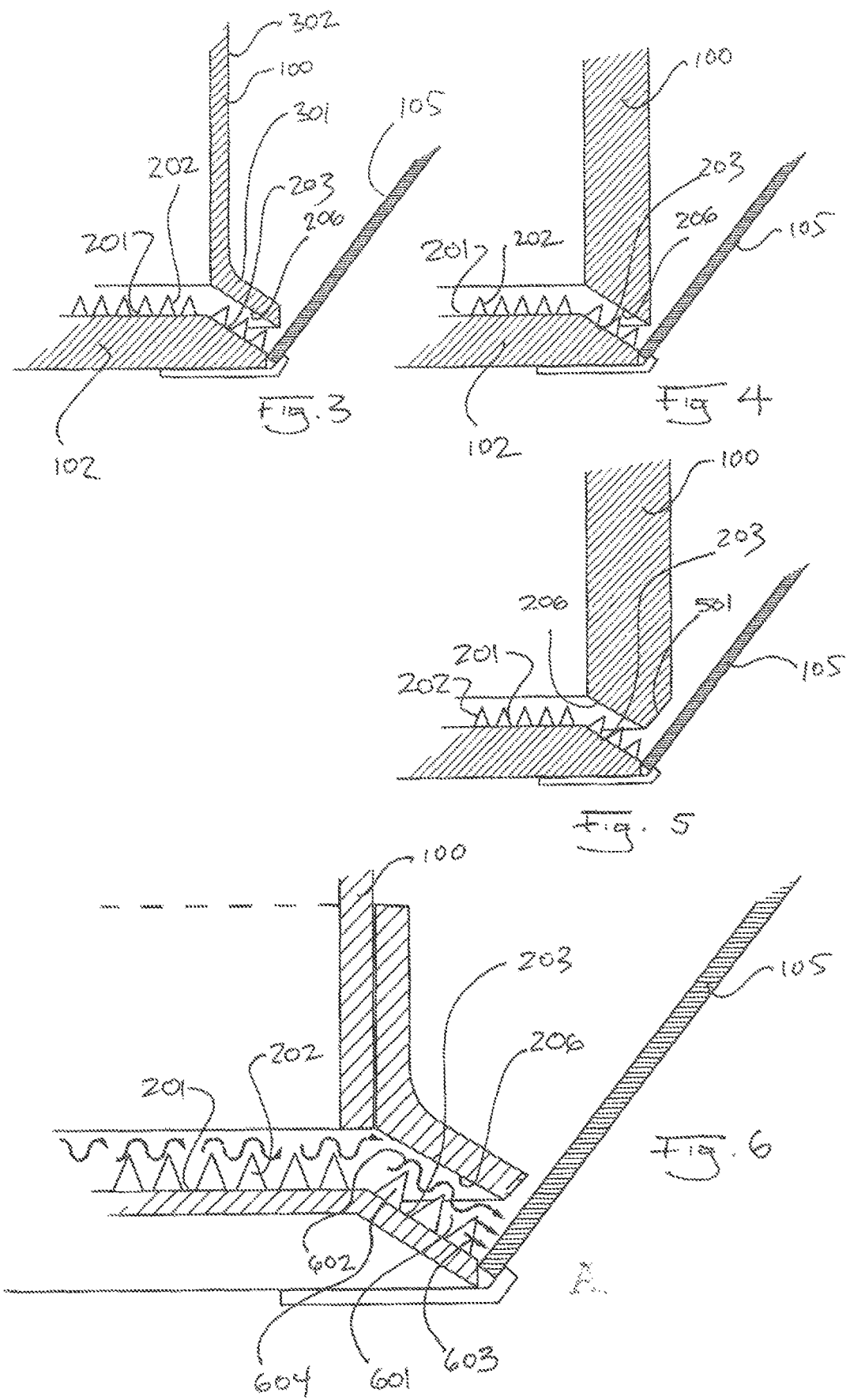

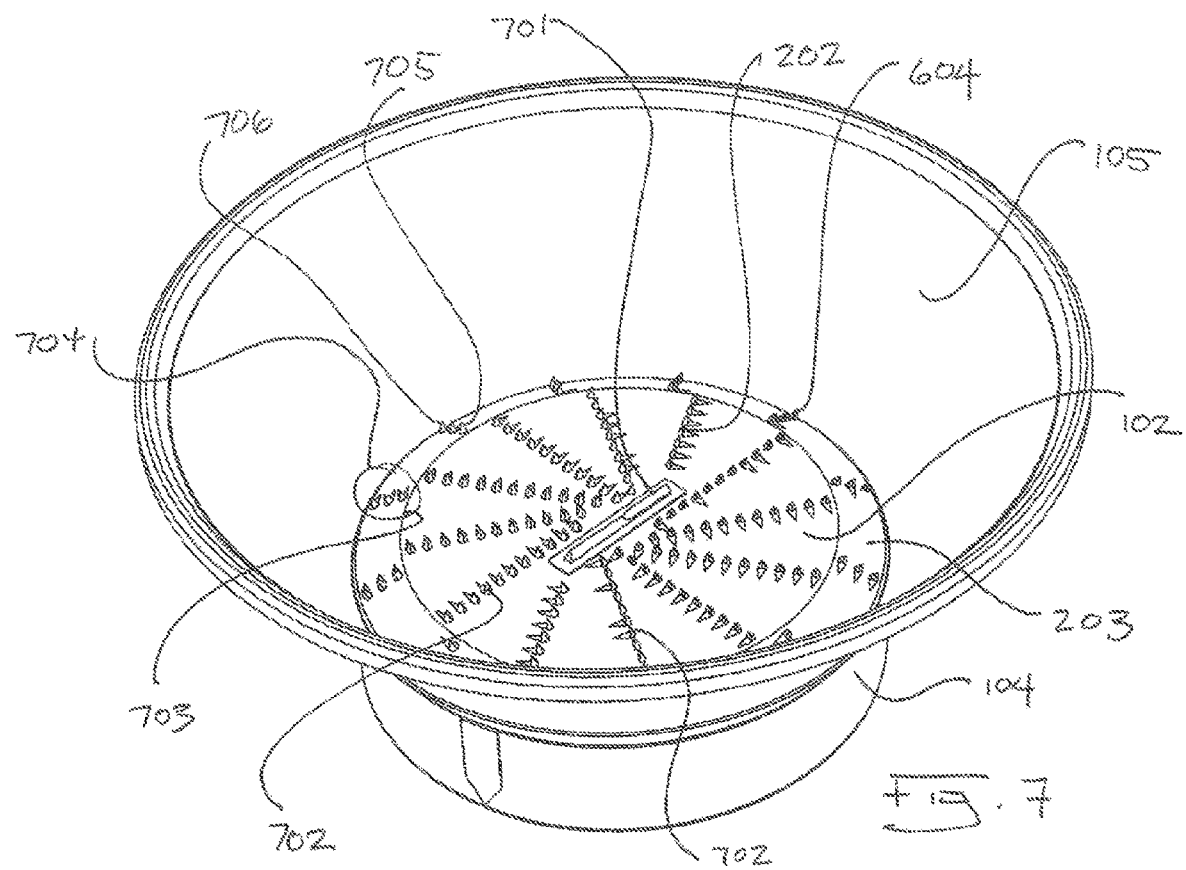
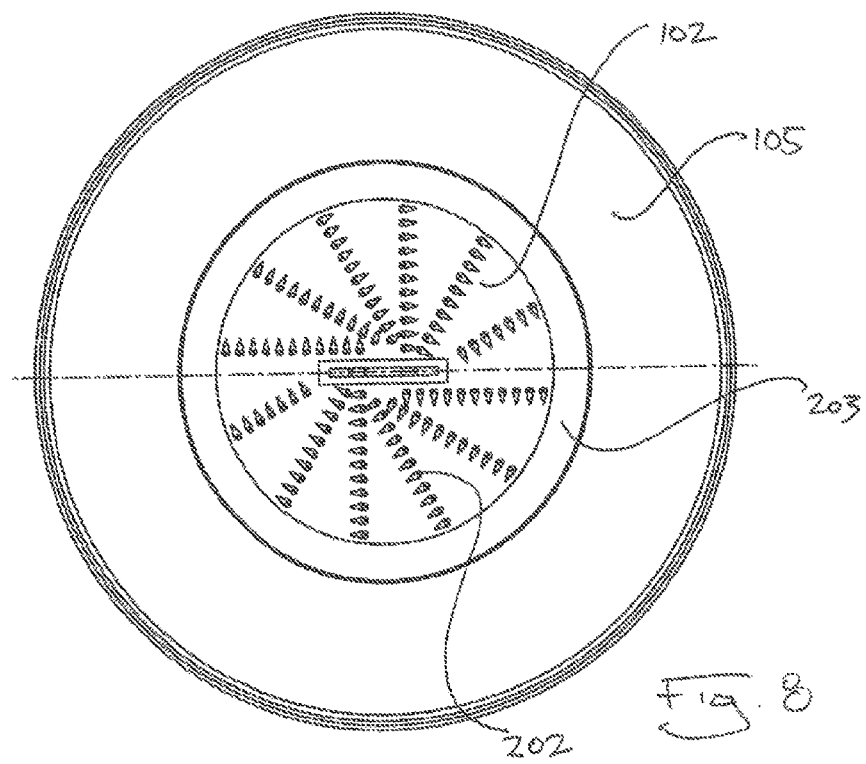

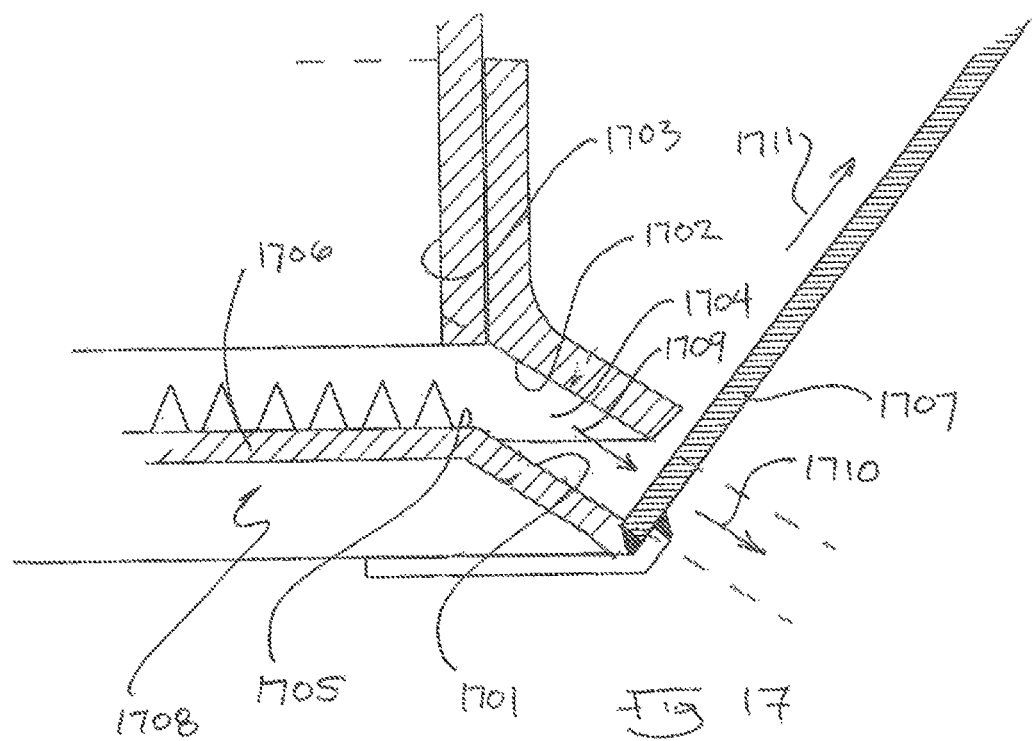
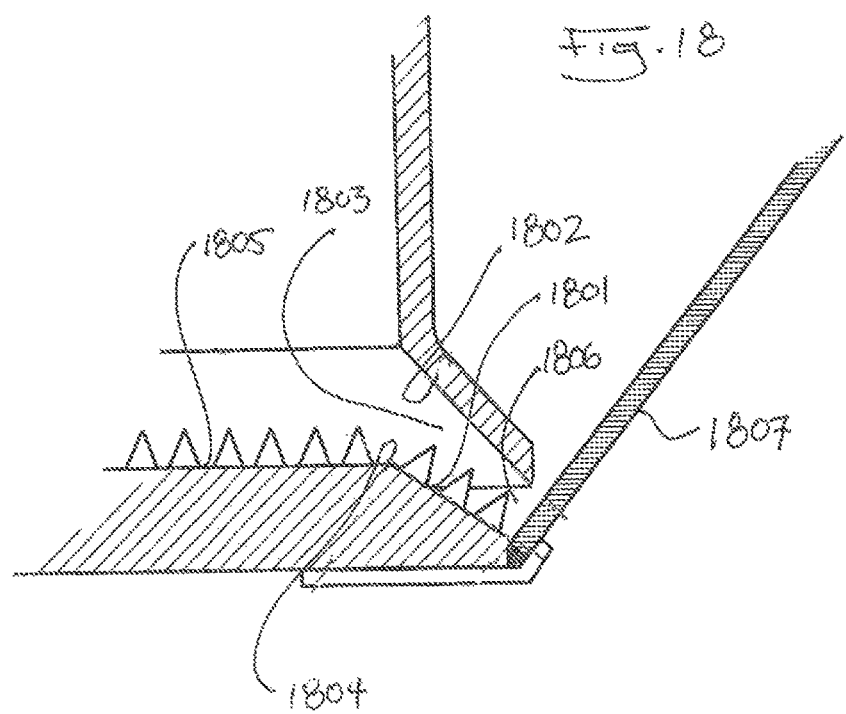

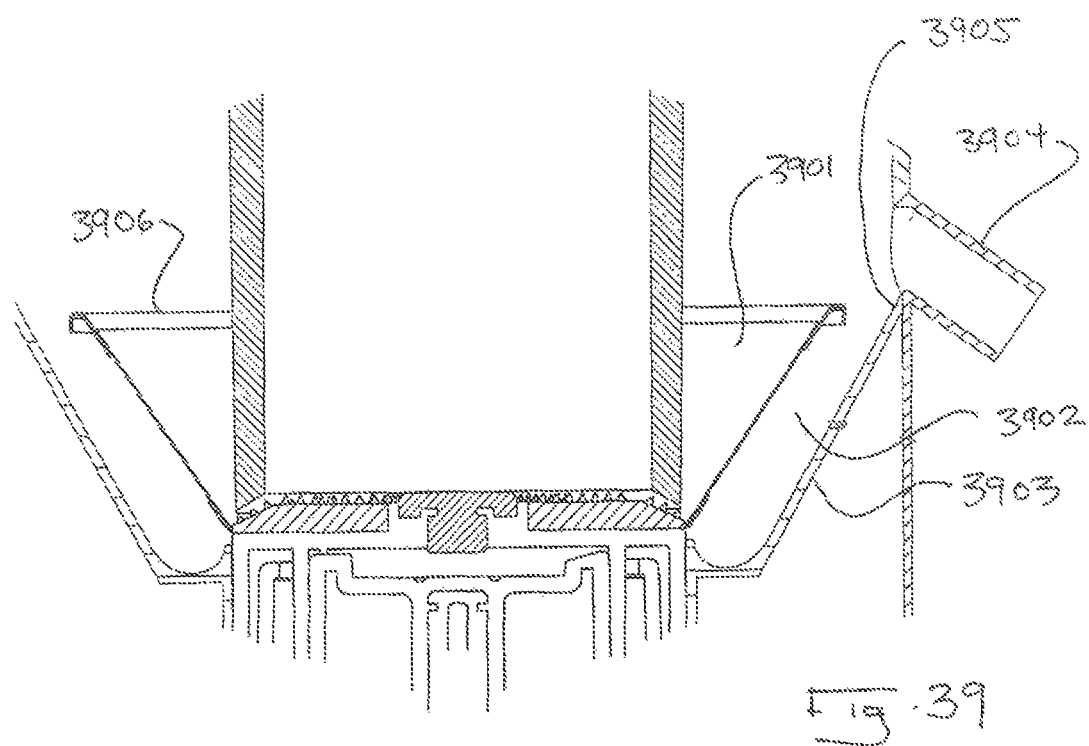
Fig. 39
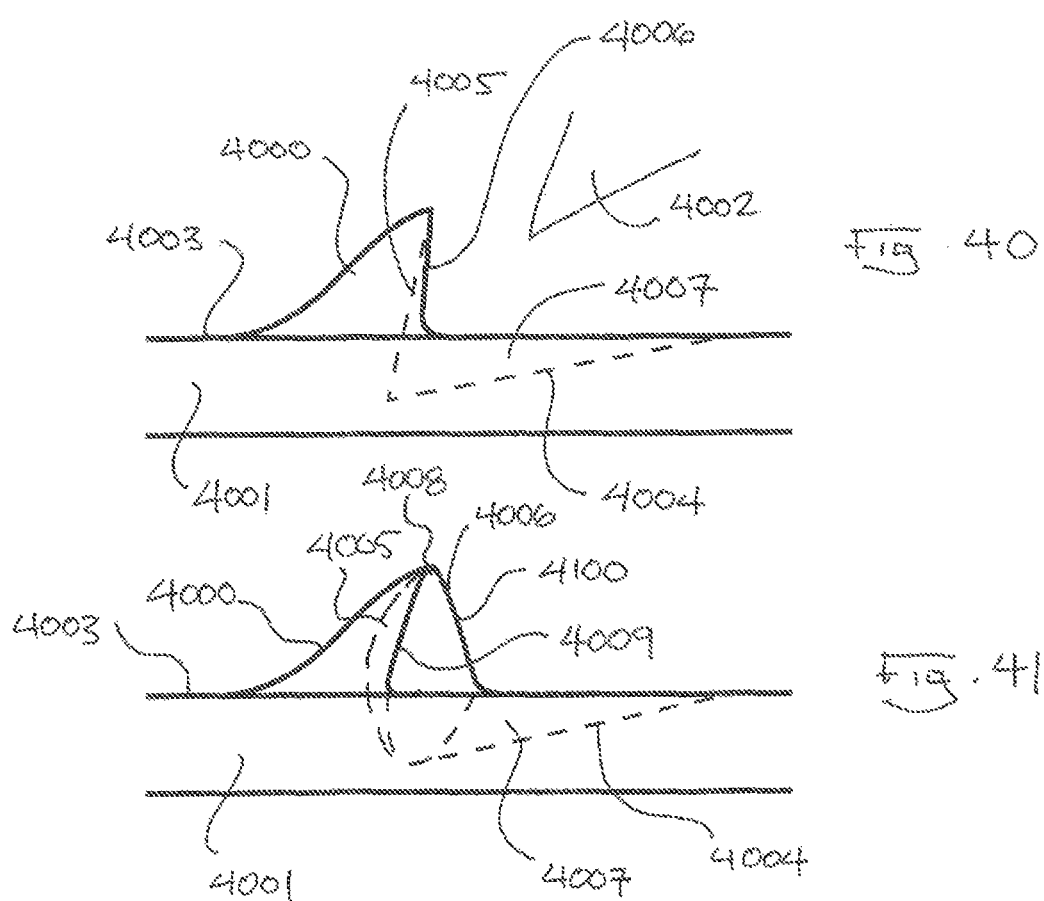
Fig. 40
Fig. 41

FRUIT AND VEGETABLE JUICER

FIELD OF THE INVENTION

The invention pertains to fruit and vegetable juicers and more particularly to improvements to a centrifugal type fruit and vegetable juicer.

BACKGROUND OF THE INVENTION

A centrifugal fruit and vegetable juicer generally has a grating disc that is arranged horizontally. Food is urged against the grating disc by a pusher located in the feed tube of the juicer. The grating disc is carried by an assembly that also includes a frusto-conical sieve. The horizontal surface of the grating disc forms a primary processing surface. Juice and pulp are expelled from the horizontal grating disc against the inclined sieve. Because the grating disc is horizontal and the sieve is inclined, the bulk of the expelled pulp and juice impacts the inner surface of the frusto-conical sieve at an angle that is not perpendicular. Further, the area of the grating disc directly below or radially outward of the side walls of the feed tube is generally under utilised in the breakdown of the fruit into its constituent pulp and juice components.

Because the grating disc is located close to the bottom of the frusto-conical sieve, the ejected pulp and juice travel along the inclined interior surface of the sieve. During this process, the rotation of the sieve causes juice to be expelled from the interior of the sieve through the sieve and into a juice collection chamber so that it can be dispensed and eventually consumed. Because some of the pulp is too large to pass through the openings in the sieve, it is expelled past the rim of the sieve. The rotating frusto-conical sieve induces or creates an airflow that assists the movement of the ejected pulp into a pulp collection chamber. However, the airflow generated by the rotating disc and sieve can create undesirable pressurisation of the pulp collection chamber. This over pressurisation can cause uncollected juice that is travelling with the pulp to be expelled from gaps associated with the pulp collection chamber, namely gaps between the pulp collection chamber and the lid of the device.

The present technology as disclosed below, addresses these issues.

SUMMARY OF THE INVENTION

Described herein is a grating disc having a primary and a secondary processing surface. The secondary processing surface is angled with respect to the primary surface and is preferably a grating surface.

Also described herein is a combination of grating disc and throttle channel that acts to prolong the time that foods are in contact with the teeth on the grating disc.

Also described herein is a combination of grating disc with a secondary processing surface that increases the number of teeth that food is in contact with before being ejected from the grating disc.

Also described herein is a combination of grating disc and throttle channel that allows food to contact teeth on the grating disc more times than in conventional arrangements.

Some embodiments of the invention provide greater proximity or increased contact time or increased contact frequency between food stuffs and the teeth on a grating disc in a centrifugal fruit and vegetable juicer.

In some embodiments of the technology, the secondary processing surface is frusto-conical and the primary processing surface is flat.

In some embodiments of the invention, a lowest interior surface of the feed tube cooperates with the secondary processing surface to form a throttle channel.

In other embodiments of the technology, the secondary processing surface contains cutting teeth of the kind associated with the primary processing surface.

In yet further embodiments of the technology, the secondary processing surface does not include cutting teeth or grinding elements.

In selected embodiments of the technology, a lid or lid portion associated with the pulp collection chamber is provided with a snorkel or central vent.

In further selected embodiments, the snorkel or vent is provided with a lid. The lid may cooperate with the snorkel or vent to form a tortuous path or baffle.

In some selected embodiments of the technology, the snorkel or vent comprises a tube that descends from the lid. In some selected embodiments, the cross-section of the vent or snorkel is shaped to minimise resistance to airflow originating from outside the pulp collection chamber.

Accordingly, there is provided a combination of grating disc having both primary and secondary processing surfaces and a feed tube having a lower edge surface that cooperates with the secondary processing surface to form a throttle channel.

There is also provided a lid having a lid portion that covers the pulp collection chamber of a centrifugal juicer. The lid portion contains an internal and upwardly directed vent tube.

BRIEF DESCRIPTION OF THE DRAWING FIGURES

In order that the invention be better understood, reference is now made to the following drawing figures in which:

FIG. 2 is a partial schematic cross-sectional view of a grating disc with secondary processing surface, throttling surface and throttle channel.

FIG. 3 is a partial schematic cross-sectional view of a grating disc with secondary processing surface, throttling surface and throttle channel.

FIG. 4 is a partial schematic cross-sectional view of a grating disc with secondary processing surface, throttling surface and throttle channel.

FIG. 5 is a partial schematic cross-sectional view of a grating disc with secondary processing surface, throttling surface and throttle channel.

FIG. 6 is a partial schematic cross-sectional view of a grating disc with secondary processing surface, throttling surface and throttle channel.

FIG. 7 is a perspective view of a grating disc and sieve in accordance with the teachings of the present technology.

FIG. 8 is a top plan view of another embodiment of a grating disc and sieve assembly.

FIG. 17 is a schematic cross-section showing a grating disc and throttling surface.

FIG. 18 is a schematic cross-section illustrating a tapered throttling channel.

FIG. 31($b$) is a second example of castellation shape.

FIG. 31($c$) is a third example of a castellation shape.

FIG. 39 is a cross-section of a conventional frusto-conical filter sieve and grating disc assembly used in conjunction with an elevated spout.

FIG. 40 is a side elevation of a tooth on a grating disc.

FIG. 41 is a three quarter side view of a tooth on a grating disc.

FIG. 43 is a top plan view of a grating disc having teeth that are orientated radially inwardly.

DETAILS DESCRIPTION

Figure 1:
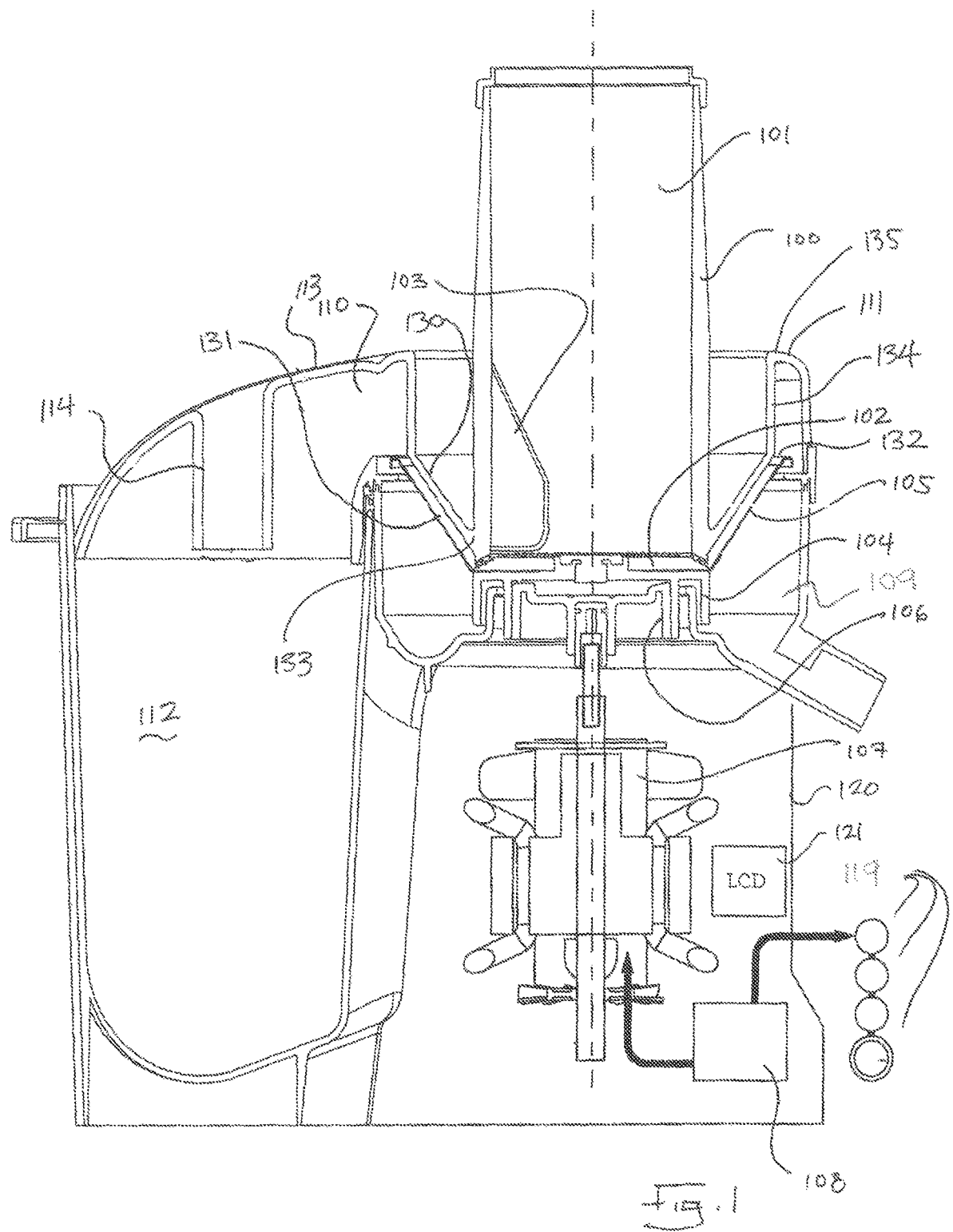
FIG. 1 is a schematic cross-section of a centrifugal juicer.

As shown in FIG. 1, a centrifugal fruit and vegetable juicer comprises a vertical feed tube 100 within which is located a pusher 101. The working parts of the juicer are contained in a body. Pulp ejected from the body is collected in a separate and removable pulp collection chamber 112. Fruits or vegetables are introduced into the feed tube 100 and urged against a rotating grating disc 102 by the removable pusher 101. An internal anti-rotation blade or fin 103 may be located within the feed tube as is known from ample prior art examples. The feed tube 101 has a slot for accommodating the blade or fin 103. Extracted juice is discharged onto the side walls of, and into a juice collection chamber 140 that surrounds the disc 102.

The grating disc 102 is part of a removable assembly that includes a base 104 with coupling features and a frusto-conical sieve 105. As will be explained, the sieve may be orientated in two different ways. The base 104 is removably received by a cooperating drive coupling portion 106 that is driven by an electric motor 107. The motor 107 is controlled by a controller 108 or microprocessor control unit, or the like. The controller 108 receives instructions from user operated controls 119, and cooperated with a graphic display 121.

The frusto-conical sieve 105 separates the juice collection chamber from the headspace 110 contained under the juicer's lid 111. Accordingly, the lid 111 assists in the diversion of the pulp expelled by the sieve 105 into the pulp collection chamber 112. As pulp is thrown upwardly and outwardly by the rotating sieve 105, the airflow generated by the rotating sieve and the shape of the lid 111 drive the expelled pulp into the pulp collection chamber 112. As will be explained, a portion 113 of the lid 111 that overlies the top of the pulp collection chamber 112 is provided with a vertically oriented and internal tube, vent or snorkel 114.

In the example of FIG. 1, the juicer's lid 111 also includes an internal frusto-conical wall 130 that surrounds the lower end of the feed tube 100. The lid's frusto-conical wall 130 lies within the sieve 105 but does not contact the sieve 105. The frusto-conical wall 130 is generally concentric with the sieve 105 and spaced apart from it so as to create a frusto-conical gap 131. The gap 131 serves to retain for a longer time, the juice and pulp products ejected from the grating disc 102, and thus limit them from entering the headspace 110, except via the toroidal opening 132 formed at the upper margin of the sieve 105, and defined by the inner surface of the sieve 105 and the outer surface of the lid's frusto-conical wall 130. In some embodiments, the lower edge 133 of the lid's frusto-conical wall 130 is joined to the lower end of the feed tube 100. An upper extent of the lid's frusto-conical wall 130 joins a cylindrical wall portion 134. The upper part of the cylindrical wall 134 joins an upper surface 135 of the lid. The manner in which the lid's frusto-conical wall 130 is joined to the lid or the feed tube is not an essential aspect of the technology so long as the wall 130 is located within the sieve 105 and sufficiently spaced away from it.

As shown in FIG. 2, a grating disc 102 has a primary processing surface 201. The primary processing surface is generally circular and flat. The surface is provided with an array of sharp cutting teeth 202 as is well known in this art. A grating disc, in accordance with the present technology, further comprises a secondary processing, cutting or grating surface 203. The primary cutting surface 201 has an effective radius 204 that is about the same as the inner radius of the feed tube 100. The secondary processing surface 203 lies radially outward of the primary processing surface 201. The secondary processing surface 203 may be toothless but optionally has, on its upper surface, a second array 205 of grating teeth. In some embodiments, the secondary processing surface 203 is angled downward from the horizontal primary processing surface to form a frusto-conical or chamfered secondary processing surface. In some embodiments, the angle formed by the secondary processing surface is such that in a radial direction (as shown in FIG. 2) it is perpendicular or near perpendicular to the filter or sieve 105.

In a conventional juicer, juice and pulp are expelled from the gap between the grating disc and the feed tube in a generally horizontal direction 201. In order to better optimise the juice extraction process, the secondary processing surface 203 is combined with a throttling surface 206 to form a throttle channel 207. The throttle channel 207 has potentially several beneficial effects in the juicing process. It can act to retain juice and foods in contact with the grating disc for a longer interval of time. It can also act to bring food stuffs into contact with the teeth on the grating disc more times or with greater frequency. Both the secondary processing surface and the throttle channel promote longer and more intimate contact between foods and the teeth on the grating disc. The throttle channel also has potential to redirect the stream of food particles and juice that are ejected from the grating disc 102. The throttling surface 206 is frusto-conical and in some embodiments generally parallel with the secondary processing surface 203 (along a given radius). Working together, the secondary processing surface 203 and throttling surface 206 create the frusto-conical throttle channel 207 that directs pulp and juice in a direction 208 that may be generally perpendicular to the sieve 105. By having the ejected pulp and juice directed perpendicularly to the sieve 105 work to potentially increase the efficiency of the juice extraction process by better utilising the kinetic energy of the expelled pulp and juice. When directed perpendicularly or close to perpendicularly, more kinetic energy is potentially available to drive the juice through the sieve 105 into the collection chamber. The throttle channel can also have a beneficial impact on the velocity of the ejected material, its time in contact with the grating teeth and other flow characteristics.

In the example of FIG. 2, the throttling surface 206 is formed on an underside of a separately formed ring 218 that is attached to the outer side wall of the feed tube 100. It will be understood that the throttling surface 206 can be formed integrally with the lower extent of the feed tube 100. Examples of throttling surface construction are shown in FIGS. 3-6.

As shown in FIG. 3, the throttling surface 206 is integral with the lower end of the feed tube 100 and extends above some of or the entirety of the secondary processing surface 203. In this example, the throttling surface 206 forms the underside of a flange or extension 301 that extends radially outward and down from the outer surface 302 of the feed tube 100.

As shown in FIG. 4, where the feed tube 100 is thick enough at its lower end, the throttling surface 206 can be formed by chamfering the lower most end surface of the feed tube 100. When the feed tube 100 is thick enough, a flange or extension 301 is not required.

As shown in FIG. 5, the lower most and outer rim 501 of the feed tube may be chamfered. This has the effect of potentially shortening the effective length of the throttling surface 206. However, additional clearance can thus be provided between the lower extremity of the feed tube 100 and the sieve 105.

As shown in FIG. 6, the cooperation between the secondary processing surface 203 and the throttling surface 206 creates a thin, frusto-conical throttle channel or passageway 601 that leads from the primary processing surface 201 to the sieve 105. As previously suggested, this channel directs pulp and juice 602 toward the sieve 105 in a direction that may be generally perpendicular to the sieve 603. In addition, and because the channel or passageway 601 is narrow and partially occluded by the teeth 604 in the passageway, the rate of flow of the pulp and juice 602 may be slowed, turbulated or throttled. This allows the teeth 604 and the passageway to have more time in which to act on or process the pulp that is in the passageway prior to its ejection from the passageway 601.

As shown in FIG. 7, the primary surface 102 is generally circular and flat. The central portion of the primary processing surface 102 comprises a pair of coring knives or blades 701. In this example, the sharpened teeth 202 on the primary processing surface 102 are formed in an array comprising 12 individual rows 702. Each row 702 terminates at or close to the outside diameter 703 of the primary processing surface 102. The secondary processing surface lies radially outward of the nominal diameter 703 of the primary processing surface 102. The secondary processing surface 203 is angled downward and comprises a second array of grating teeth 604. In this example, the second array comprises twelve 12 rows of teeth 604. Each row in this example comprises three teeth. Each row 704 is angularly offset from one of the rows 702 in the first array. The innermost tooth 705 in a row 704 is adjacent to the outer diameter 703 of the primary processing surface 102. The outermost tooth 706 in a row 704 is adjacent to the outer diameter of the secondary processing surface 203 and therefore adjacent to or closer to the sieve 105.

As shown in FIG. 8 the secondary processing surface 203 need not have any teeth or grating or other features. Working in combination with the throttling surfaces of the kinds disclosed with references to FIGS. 2-6, the secondary processing surface 203 finds utility in the redirection and optimal slowing of the stream of juice and pulp exiting the primary processing surface 102.

Figure 9:
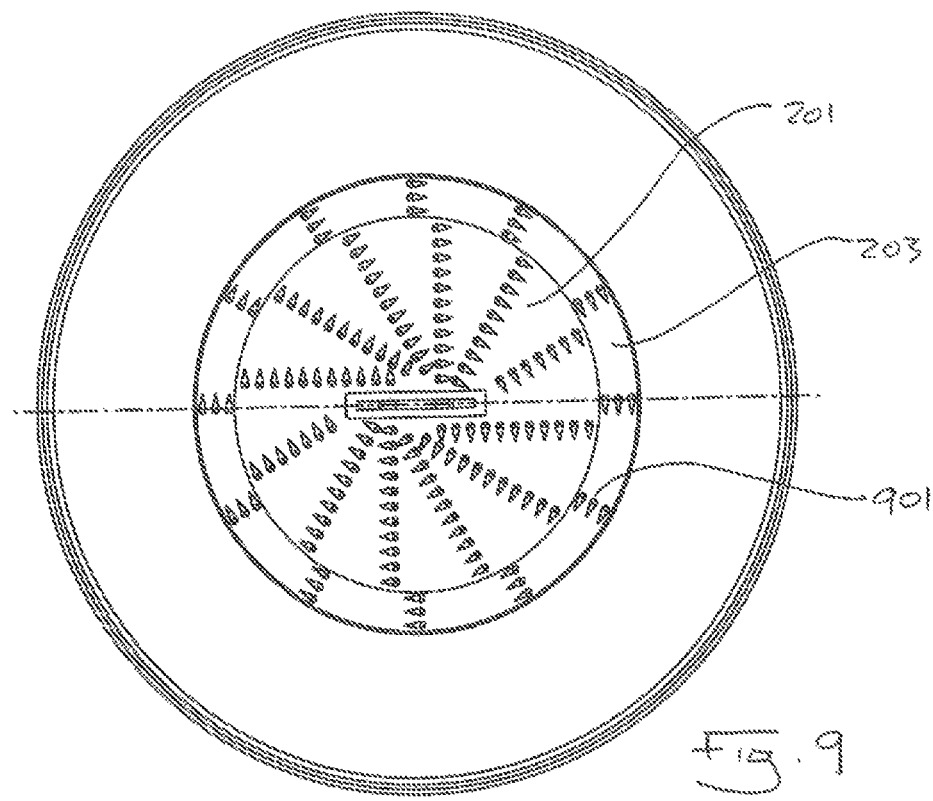
FIG. 9 is a top plan view of another embodiment of a grating disc and sieve assembly.

As shown in FIG. 9 the teeth 901 on the secondary processing surface 203 can be arranged in equally spaced rows. The teeth 901 in each row fall along a common radius. In this example, the number of rows of teeth on the secondary processing surface 203 are the same as the number of rows of teeth on the primary processing surface 201.

Figure 10:
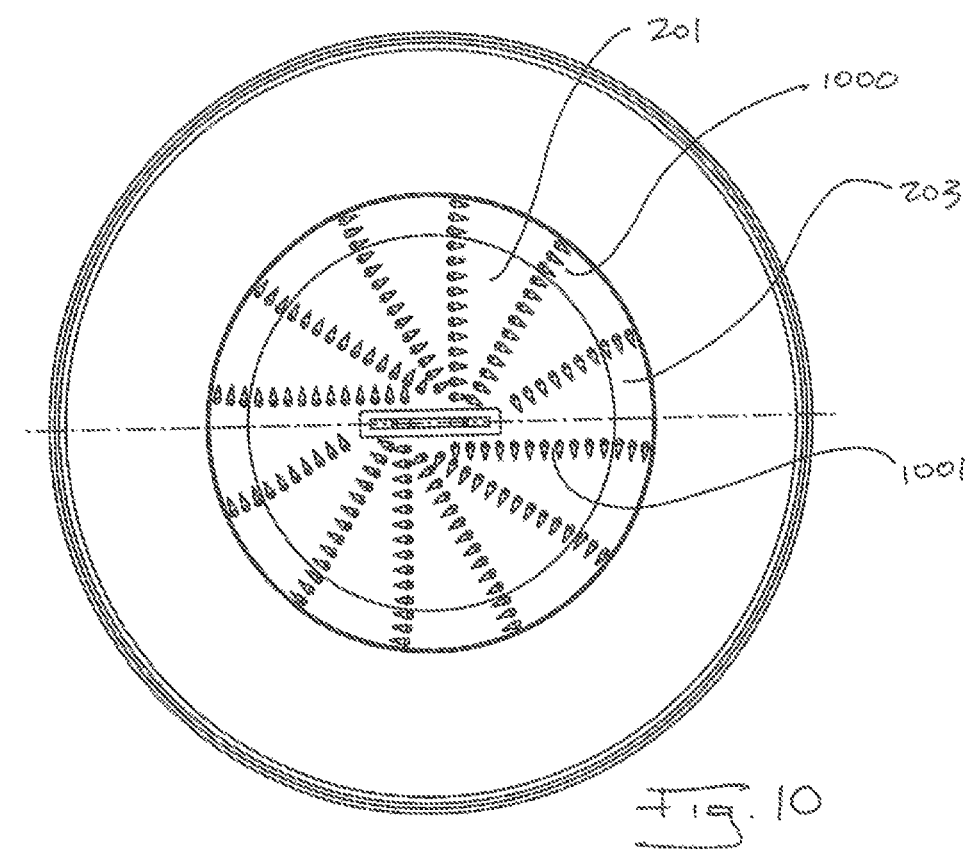
FIG. 10 is a top plan view of another embodiment of a grating disc and sieve assembly.

As shown in FIG. 10, the rows of teeth 1000 on the secondary processing surface 203 may be co-linear or nearly co-linear with the rows of teeth 1001 on the primary processing surface 201.

Figure 11:
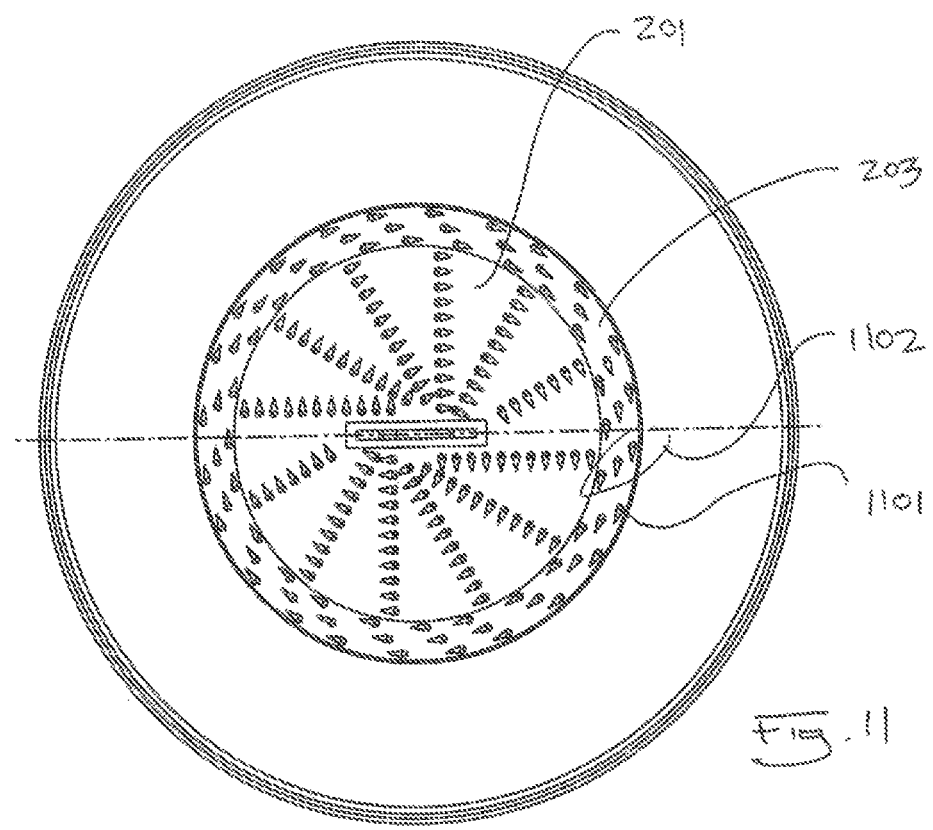
FIG. 11 is a top plan view of another embodiment of a grating disc and sieve assembly.

As shown in FIG. 11, teeth 1101 on the secondary processing surface 203 may be arranged in rows 1102 that are staggered or angled with respect to a radius of the primary processing surface 201. In this example there are more angled rows 1102 than there are linear rows of teeth on the primary processing surface 201.

Figure 12:
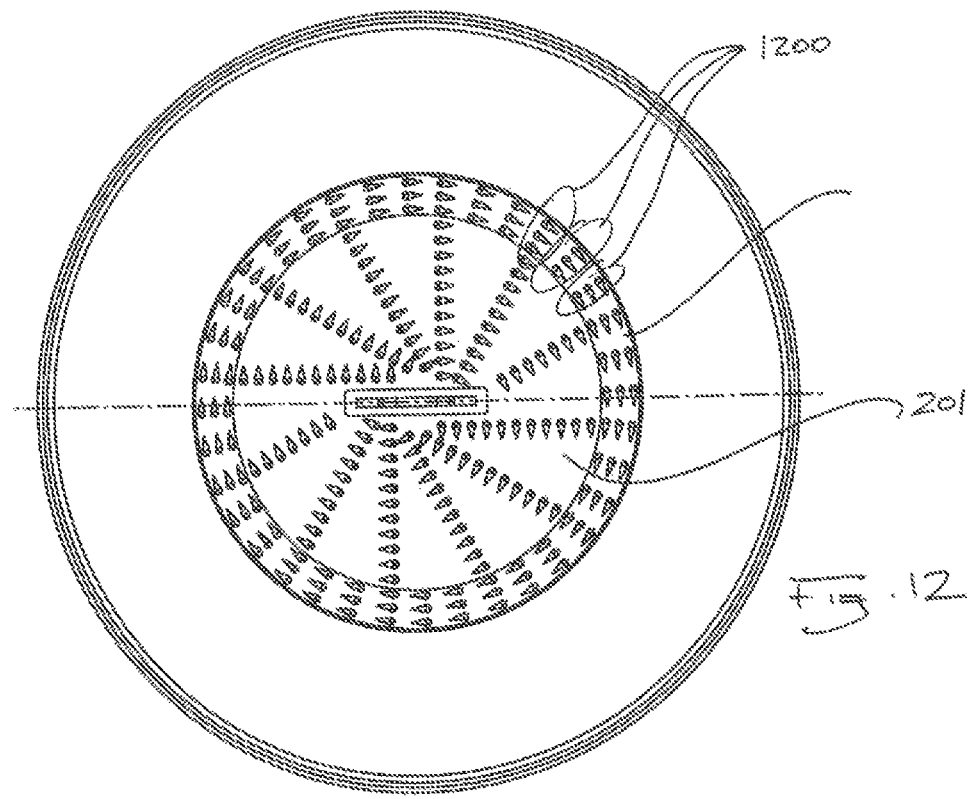
FIG. 12 is a top plan view of another embodiment of a grating disc and sieve assembly.

In the example of FIG. 12, there are three rows 1200 of teeth on the secondary processing surface 203 for every row of teeth on the primary processing surface 201. In this example, the rows are oriented radially with respect to the centre of the primary processing surface 201.

Figure 13:
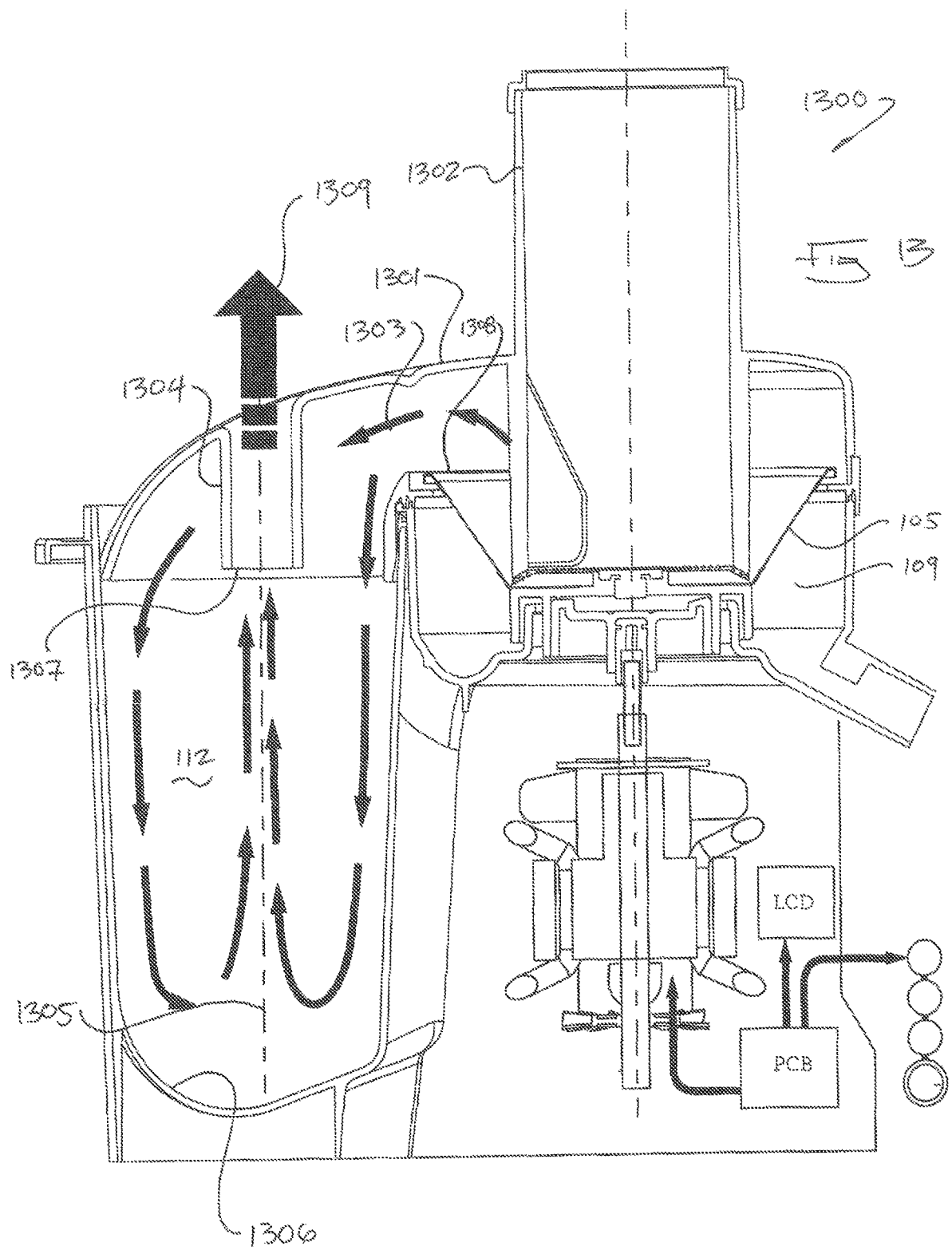
FIG. 13 is a schematic cross-sectional view of a centrifugal juicer having a snorkel or vent above the pulp collection chamber.

As shown in FIG. 13, a centrifugal fruit and vegetable juicer 1300 has a transparent polymer lid 1301 that, in this example, includes the integral feed tube 1302. The lid 1301 covers the sieve 105 and the juice collection chamber 109 and extends to also cover the pulp collection chamber 112. The high speed rotation of the grating disc and sieve create a flow of air under the lid 1301. Essentially, an airstream 1303 is propelled by the action of the rotating sieve toward the pulp collection chamber 112. This flow of air helps to direct the pulp toward and eventually into the pulp collection chamber 112. In this example, the lid 1301 includes an internal vent, chimney, tube or snorkel 1304. In this example, the vent 1304 is located above or approximately above the vertical centre line 1305 of the pulp collection chamber 112. The vent 1304 extends from the surface of the lid 1301 downward and toward the floor 1306 of the pulp collection chamber 112. In this example, the vent 1304 is tubular, having a lower opening 1307 that is below the level of the upper rim 1308 of the sieve 105. Having the lower opening 1307, lower than the rim 1308 of the sieve 105 reduces the prospect that pulp can be blown into the vent 1304 and thereby expelled in the airstream 1309 that exits the vent 1304.

Figure 14:
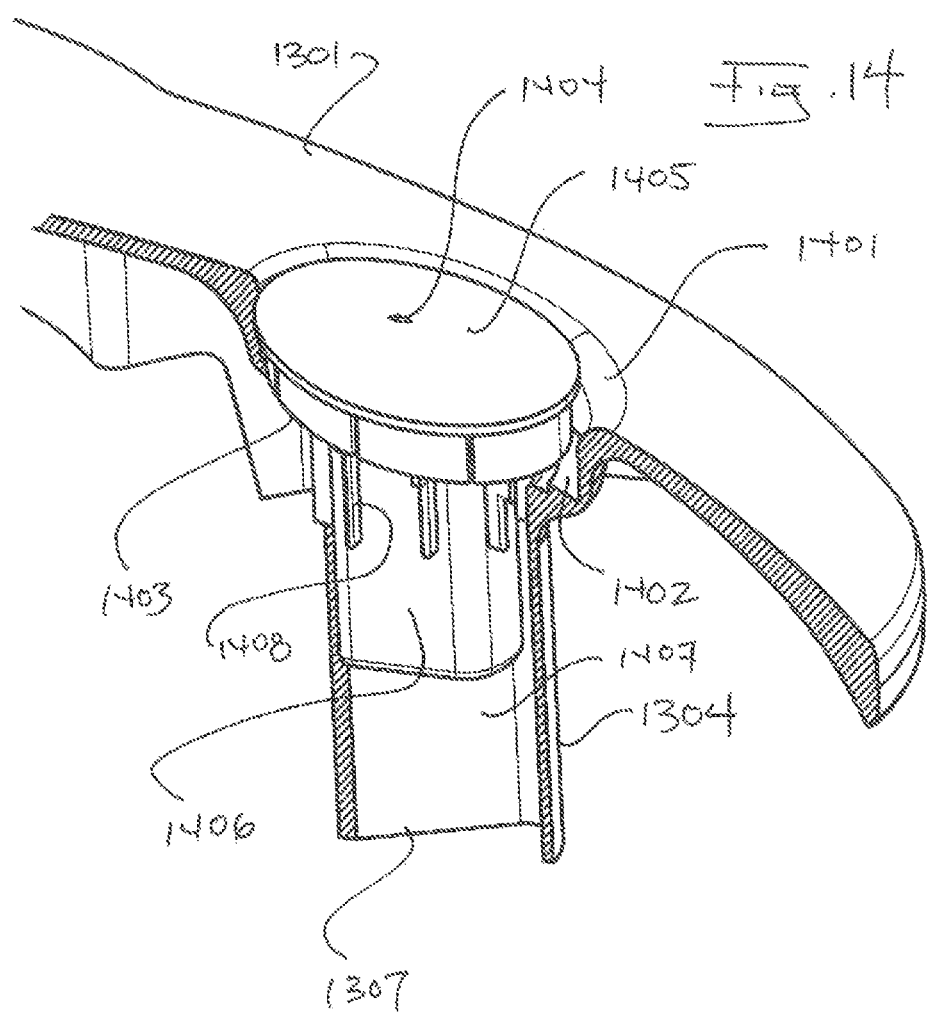
FIG. 14 is a perspective view, partially cross-sectioned of a lid for a centrifugal juicer having a vent and vent cap.

As shown in FIG. 14 the lid 1301 has an opening 1401 on its upper surface that leads into the interior space of the vent 1304. Below the opening 1401 there is a circumferential shelf 1402 for receiving the lower rim 1403 of a vent cap 1404. The vent cap 1404 has an upper surface 1405 that is preferably flush or only slightly above or below the level of the upper surface of the lid 1301. The upper surface 1405 of the vent cap 1404 is supported by a peripheral rim, the lower edge of which 1403 rests on the shelf 1402. In preferred embodiments, the vent cap 1404 further includes a plug 1406 that descends into the throat or internal area 1407 of the vent. The plug 1406 may incorporate an array of vertical ribs 1408 that maintain a space or gap between the outside surface of the plug 1406 and the inside surface of the vent.

Figure 15:
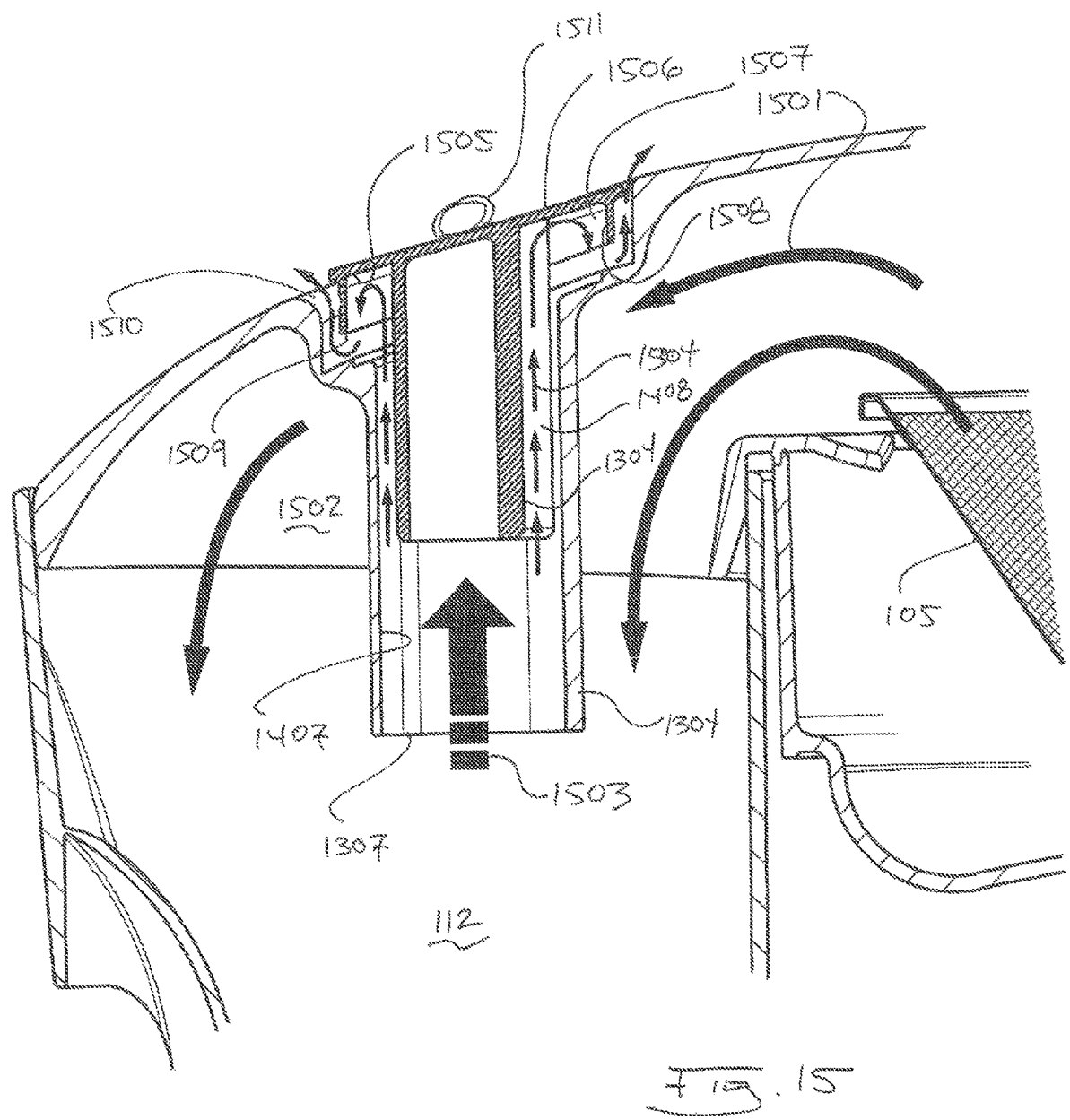
FIG. 15 is a cross-sectional view of a centrifugal juicer lid having a vent and vent cap located above the pulp collection chamber.

As shown in FIG. 15, airflow 1501 associated with the movement of the sieve 105 enters the head space 1502 above the pulp collection chamber 112, and flows past the vent 1304. The airflow 1501 and the force of gravity will tend to deposit pulp and juice into the pulp collection chamber 112. Generally, only moving air 1503 will enter the lower opening 1307 of the vent 1304. However, some juice may be entrained in the airflow and some of the smaller pulp particles may also be carried by the airflow 1503 up and into the central passageway of the vent 1304. To prevent excessive escape of juice and pulp from the vent 1304, the vent cap can work with the vent to form a tortuous path or baffle. In this example, airflow upward through the vent 1504 passes along the vertical ribs 1408 and in the gap between the plug 1304 and the inner wall of the throat 1407. The upward flow 1504 impinges on an underside 1505 of the vent cap's upper surface 1506. The circumferential groove between the cap's rim, 1508 and the exterior of the plug bends and diverts the airflow past the lower rim 1509 of the rim 1508 whereby it can escape in the gap 1510 located between the rim 1508 and the opening in the lid 1401, 1510 that receives it. The vent plug may have a pull-ring 1511, handle or knob for assisting in the removing of the vent cap from the vent.

Figure 16:
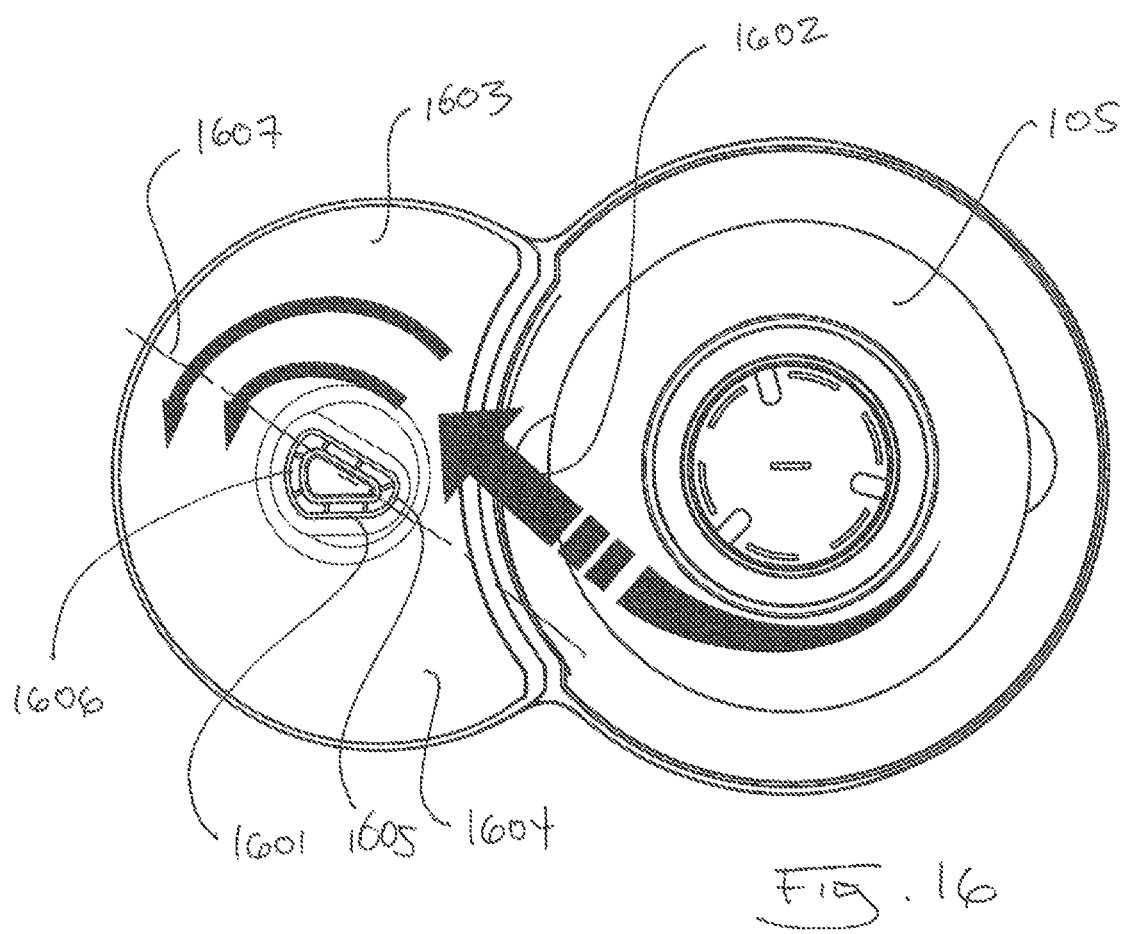
FIG. 16 is a top plan view of a centrifugal juicer having, a pulp collection chamber.

As shown in FIG. 16, the location and cross-sectional shape of the lid's vent 1601 may be optimized in relation to the airflow 1602 being delivered from the area surrounding the rotating sieve 105. In the example of FIG. 16, the vent 1601 is located on the lid 1603, centrally of the pulp collection chamber 1604 but in a way that it does not excessively obstruct the bulk of the airflow 1602. Further, the surface of the vent 1605 facing the airflow 1602 is preferably minimised and thus smaller than the surface 1606 facing away from the airflow 1602. As suggested by FIG. 16, the vent can be seen, in cross-section as having a major transverse axis 1607. In this embodiment, the axis 1607 is oriented so that it is generally parallel with airstream 1602 entering the pulp collection chamber.

As previously disclosed, the secondary processing surface may be flat and featureless or in the alternative, may be provided with grating teeth, grinding features or other features to assist in the breakdown and transport of foods toward the sieve in the juicer. Further, the secondary processing surface may be advantageously combined with a throttling surface to form a throttling channel. The throttling channel may be used to lengthen the flow path between the primary processing surface and the sieve and to change the direction, rate or other flow characteristics of foods after they are discharged from the primary processing surface. Further examples are provided in FIGS. 17-26.

As shown in FIG. 17 a frusto-conical secondary processing surface 1701 may be completely or partly lacking in grating teeth. In this example, the secondary processing surface of grating disc 1701 is combined with a cooperating throttling surface 1702 that surrounds the lower end of the feed tube 1703. The combination of secondary processing surface 1701 and throttling surface 1702 form a frusto-conical throttling channel 1704 that leads from the outer edge 1705 of the primary processing surface 1706 to the frusto-conical sieve 1707. In this example, the sieve 1707 is affixed to the grating disc and forms part of the grating disc assembly 1708. Thus, foods 1709 exiting the throttling channel 1704 will impact the sieve 1707 at a 90 degree angle, or in any event, more perpendicularly than prior art juicers where foods exit the primary processing surface 1706 horizontally. In this example, juice 1710 will pass through the sieve and pulp 1711 will travel upwardly and outwardly, eventually being ejected past the upper rim of the rotating sieve 1707.

As shown in FIG. 18, the frusto-conical surface of the secondary processing surface 1801 need not be parallel with the frusto-conical surface of the throttling surface 1802. In the example of FIG. 18 the throttling channel 1803 is tapered, having a wide entry adjacent to the outer edge 1804 of the primary processing surface 1805 and a narrower exit or mouth 1806 adjacent to the sieve 1807.

Figure 19:
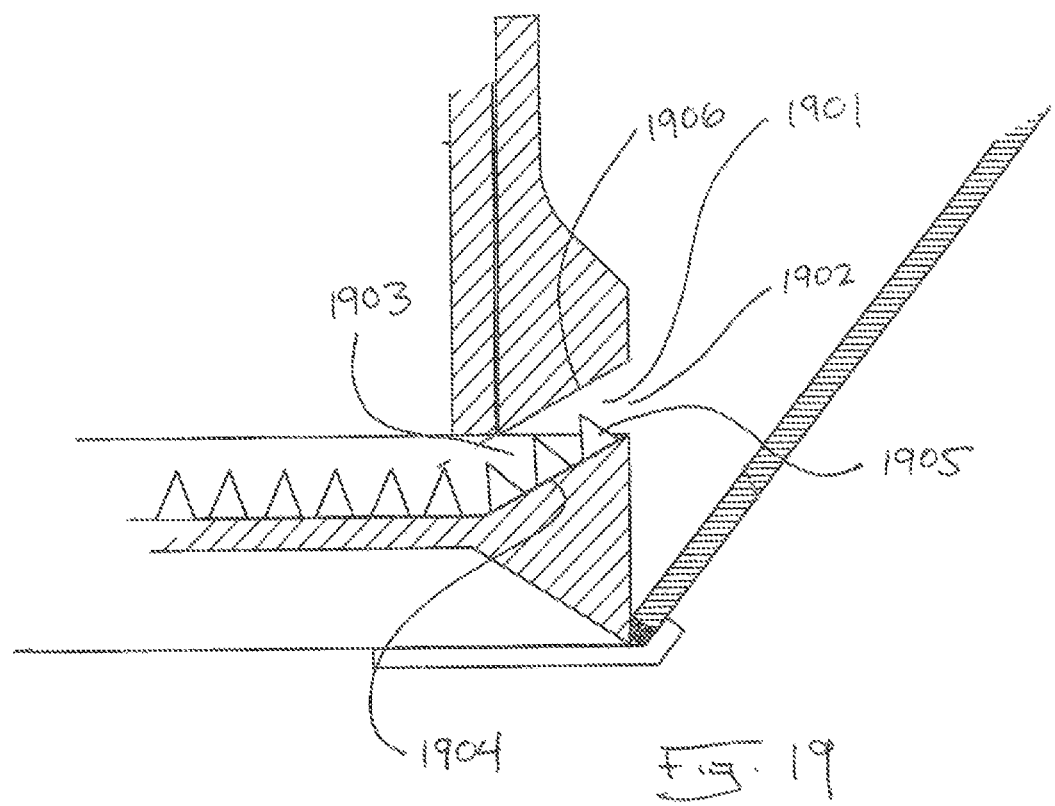
FIG. 19 is a schematic cross-section of a grating disc and throttling surface forming an upwardly directed throttling channel.

As shown in FIG. 19, the throttling channel 1901 may have parallel side walls but directed upwardly. Thus, the exit 1902 of throttling channel 1901 is higher than the entry 1903 of the throttling channel 1901. In this example, the secondary processing surface 1904 is inclined upwardly and provided with grating teeth 1905. The throttling surface 1906 surrounding the lower end of the feed tube is inclined upwardly at an angle that is generally parallel to the angle of the secondary processing surface 1904.

Figure 20:
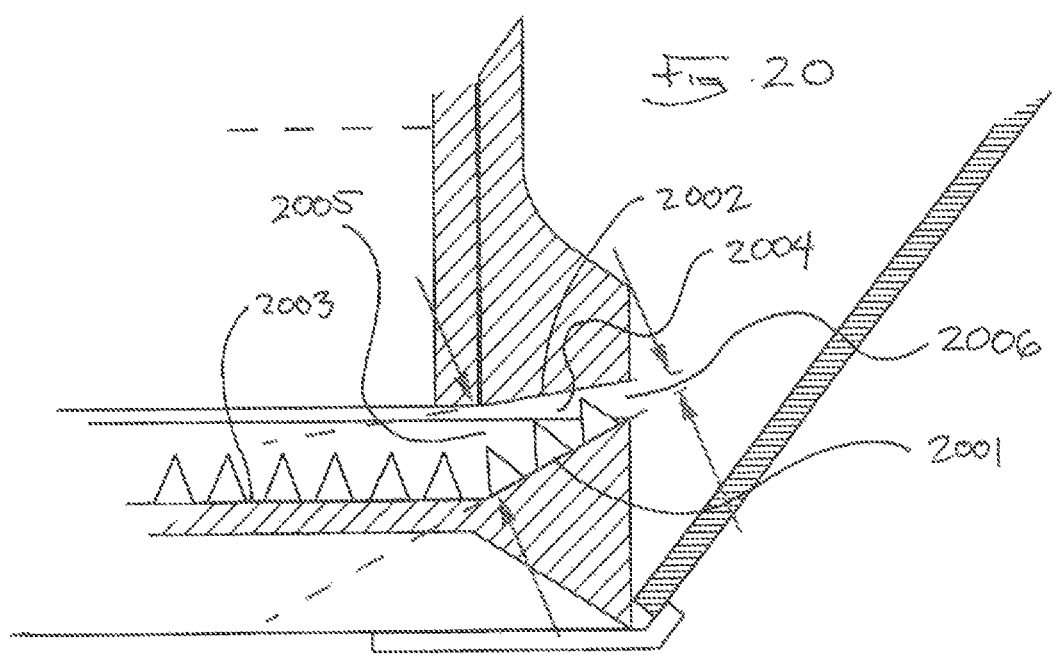
FIG. 20 is a schematic cross-section illustrating an upwardly directed and tapered throttling channel.

In the example of FIG. 20, both the secondary processing surface 2001 and the throttling surface 2002 are directed or angled upwardly with reference to the horizontal surface 2003 of the primary processing surface. Although both the throttling surface 2002 and the secondary processing surface 2001 are directed upwardly and away from the horizontal, the throttling channel 2004 is tapered. Thus, the entry 2005 to the throttling channel is wider than the exit 2006.

In some centrifugal juicers, the filter sieve is arranged so that it tapers from a smallest diameter at the top, to a widest diameter at the bottom. In juicers of this kind having an "inverted" sieve, pulp travels downwardly and outwardly along the interior surface of the sieve and is ejected below the level of the grating disc. Juicers of this kind are exemplified by, for example, the Phillips HR1873 Juicer. The technology previously disclosed regarding the secondary processing surface, throttling surface and throttling channel are seen in FIGS. 21-24 applied to this type of grating disc and sieve arrangement.

Figure 21:
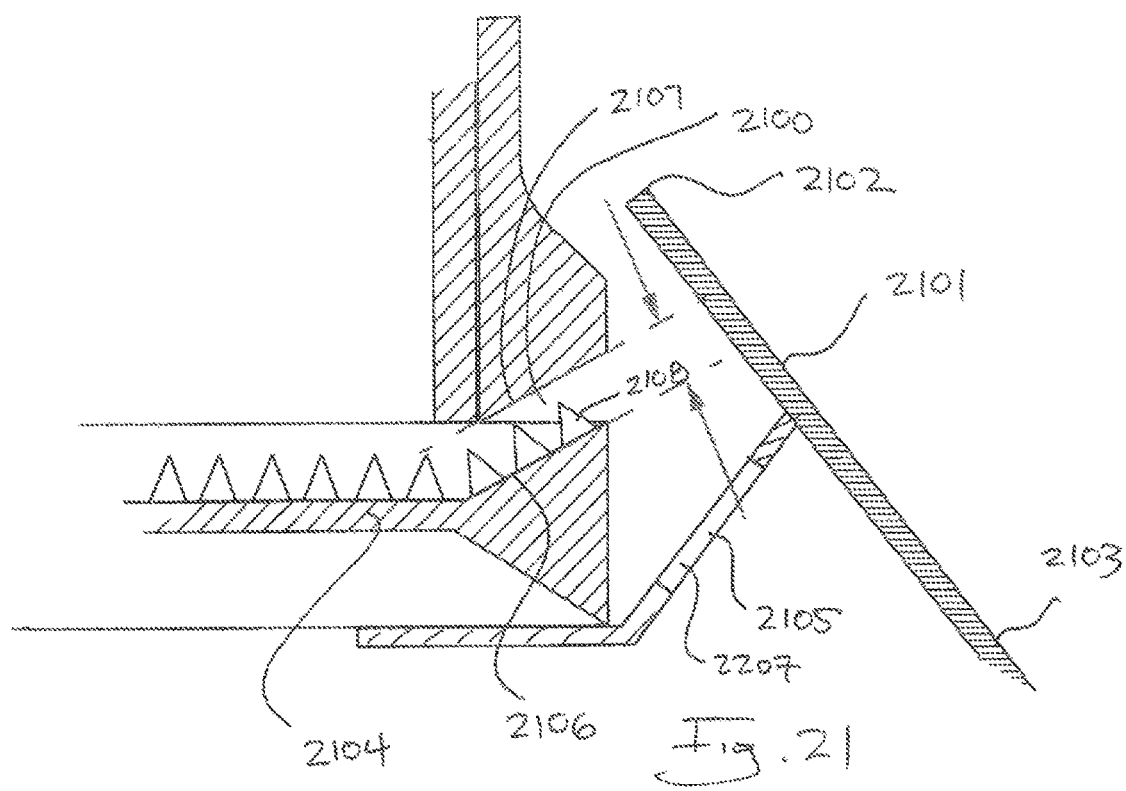
FIG. 21 is a schematic cross-section illustrating an upwardly directed throttling channel and inverted sieve arrangement.

As shown in FIG. 21, an upwardly directed throttling channel 2100 is directed approximately perpendicularly to a downward discharging sieve 2101. As exemplified in FIG. 21, the inverted sieve 2101 has a smaller diameter at its top 2102 and a larger diameter at its lower end 2103. The sieve 2101 is rigidly attached to the grating disc 2104 by a flange or struts or the like 2105. In this example, the secondary processing surface 2106 and the throttling surface 2107 are generally parallel and directed upwardly at the sieve 2101. Optional grating teeth 2108 are provided on the secondary processing surface 2106.

Figure 22:
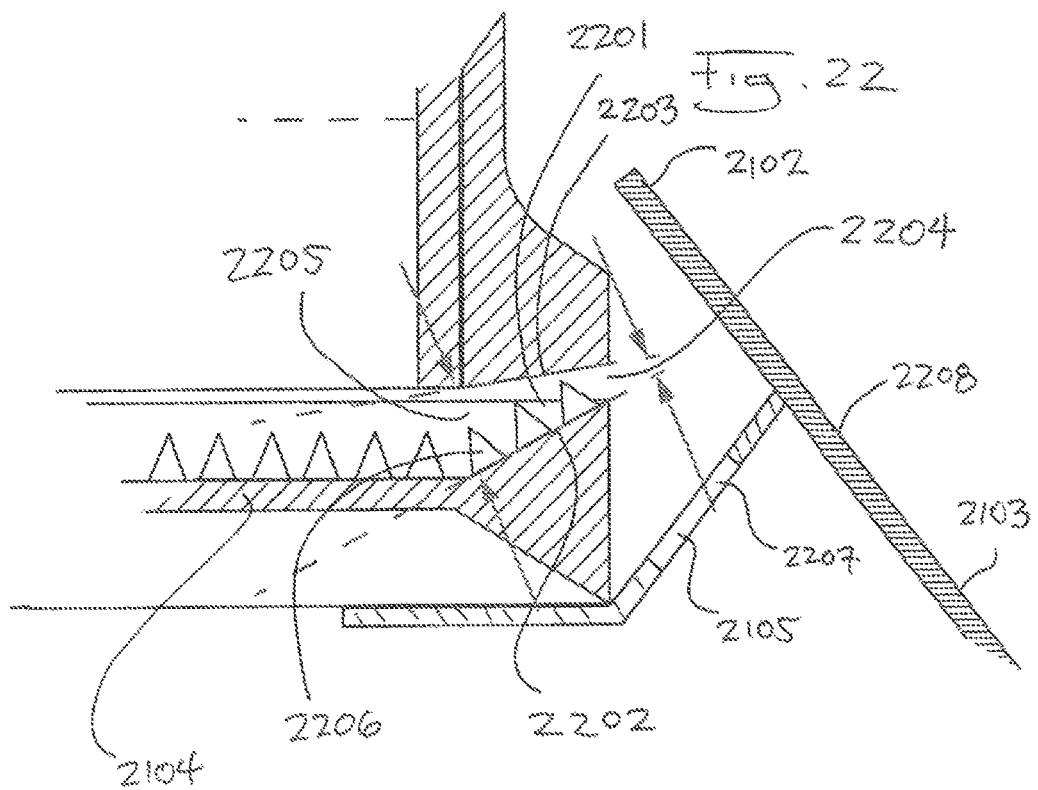
FIG. 22 is a schematic cross-section illustrating an inverted sieve type grating disc assembly having an upwardly directed and tapered throttling channel.

As shown in FIG. 22, an upwardly directed throttling channel 2201 may be tapered. The upward inclination of the secondary processing surface 2202 and throttling surface 2203 provide for a narrow exit 2204 and a wider entrance 2205 to the throttling channel 2201. The secondary processing surface 2202 is shown as being provided with grating teeth 2206 but it will be understood that the grating teeth 2206 are optional. Openings 2207 may be formed through the struts or flanges that attach the sieve 2208 to the grating disc 2104.

Figure 23:
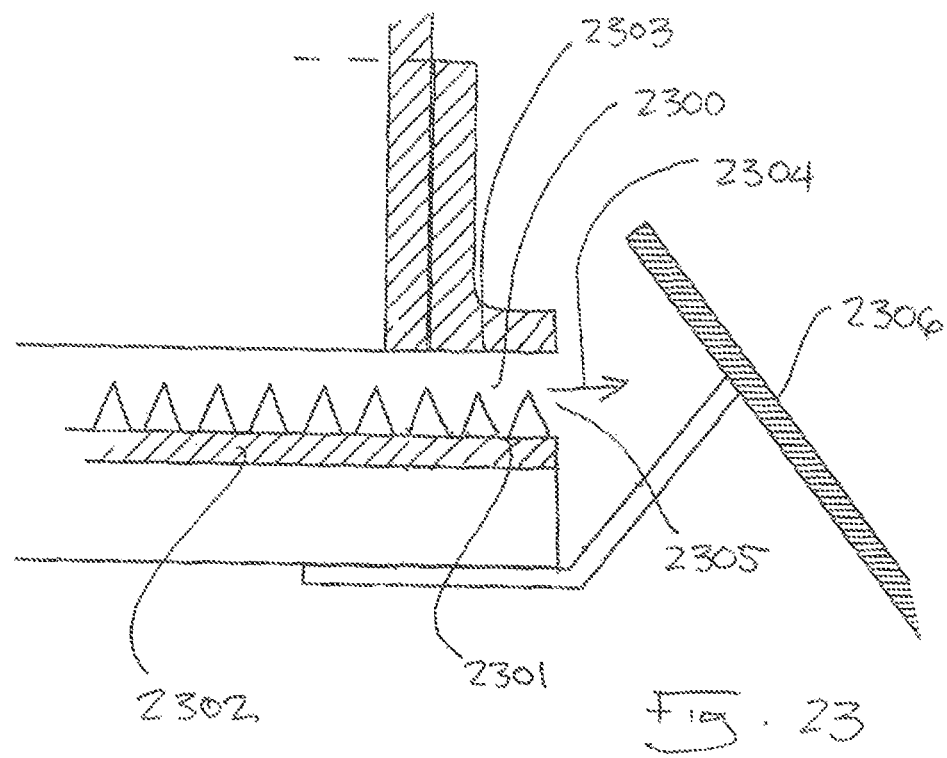
FIG. 23 is a schematic cross-section illustrating a flat and co-planer secondary processing surface used in conjunction with an inverted sieve.

As shown in FIG. 23, the throttling channel 2300 may be directed horizontally. In the example of FIG. 23, the secondary processing surface 2301 is horizontal and co-planer with the primary processing surface 2302. In this example, the throttling surface 2303 is generally parallel with the secondary processing surface 2301. Thus, the foods 2304 ejected from the exit 2305 of the throttling channel 2300 are directed approximately horizontally toward the inverted sieve 2306.

Figure 24:
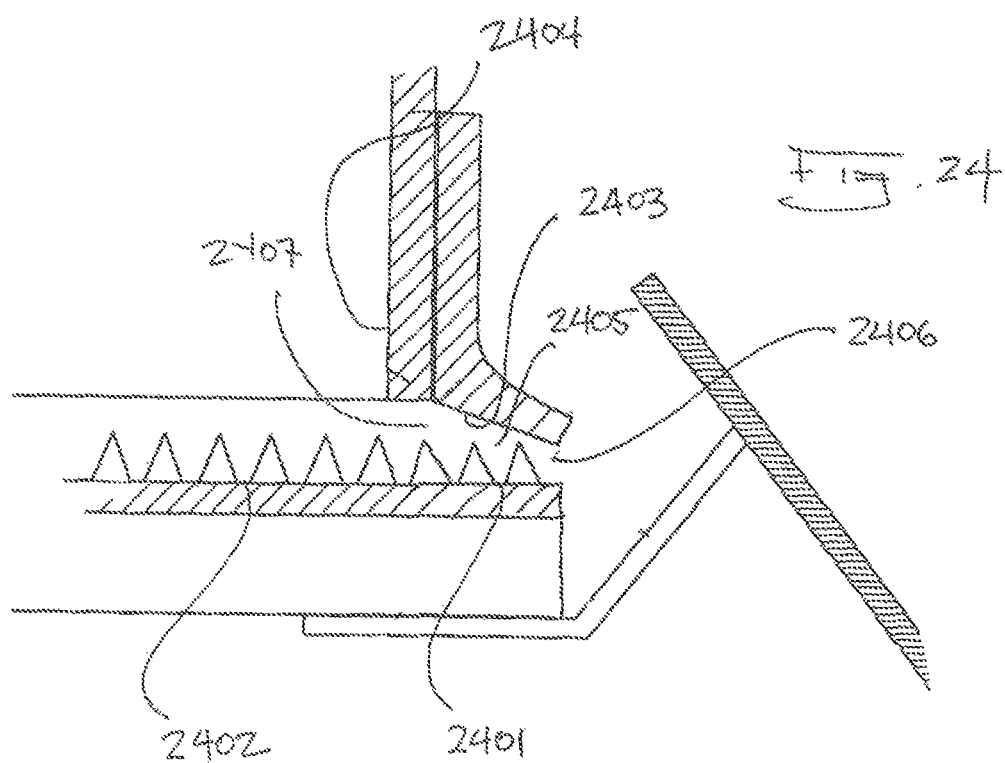
FIG. 24 is a schematic cross-section illustrating a flat and co-planer secondary processing surface forming a tapered throttling channel used with an inverted sieve.

In the example of FIG. 24, the secondary processing surface 2401 is flat and co-planer with the primary processing surface 2402 hut the throttling surface 2403 is inclined downwardly forming a frusto-conical surface that surrounds the lower end of the feed tube 2404. This creates a tapered throttling channel 2405, the exit of the throttling channel 2406 being narrower than the entry 2407.

Figure 25:
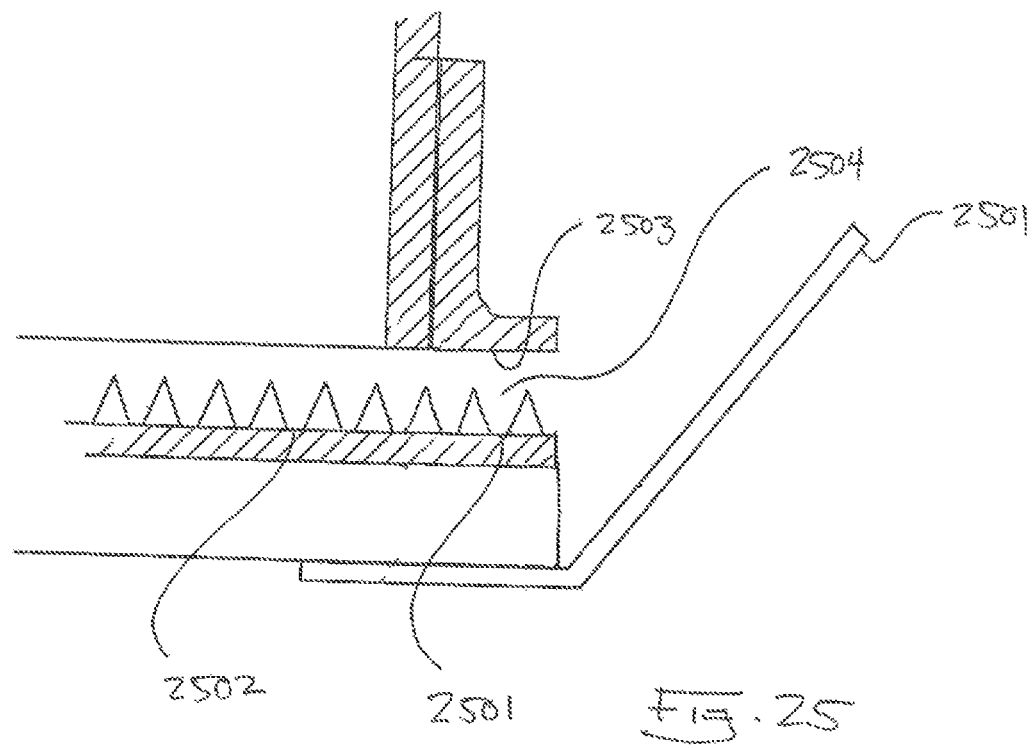
FIG. 25 is a schematic cross-section illustrating a flat and co-planer secondary processing surface and horizontally directed throttling channel.
Figure 26:
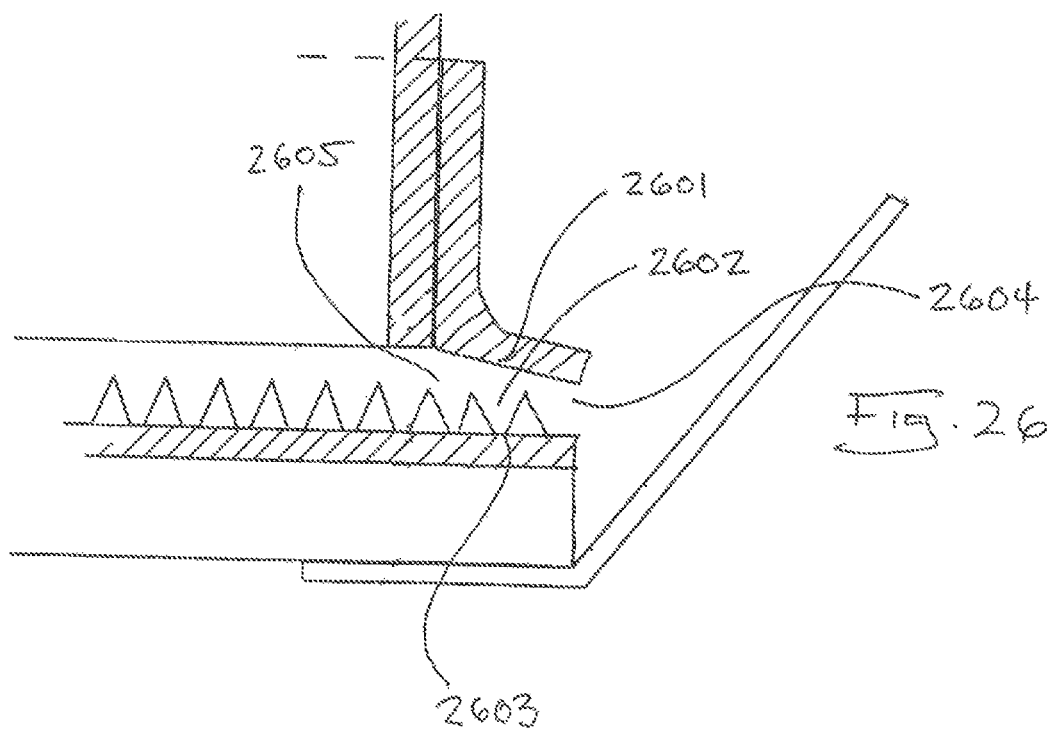
FIG. 26 is a schematic cross-section illustrating a tapered throttling channel and flat secondary processing surface.

Teachings relating to a flat secondary processing surface as shown in FIGS. 23 and 24 are applied to a conventional grating disc and sieve in FIGS. 25 and 26. As shown in FIG. 25, in the conventional arrangement, the frusto-conical sieve has its largest diameter 2501 at is upper extent. As shown therein, the secondary processing surface 2501 is flat and co-planer with the primary processing surface 2502. The throttling surface 2503 is generally parallel with the secondary processing surface 2501. Thus, the throttling channel 2504 is horizontal and not tapered. In the example of FIG. 26, the throttling surface 2601 is inclined downwardly to create a tapering in the throttling channel 2602. Because the throttling surface 2601 is inclined downwardly and the secondary processing surface 2603 is flat, the resulting throttling channel 2602 is tapered, having a narrower exit opening 2604 and a wider entry 2605.

Figure 27:
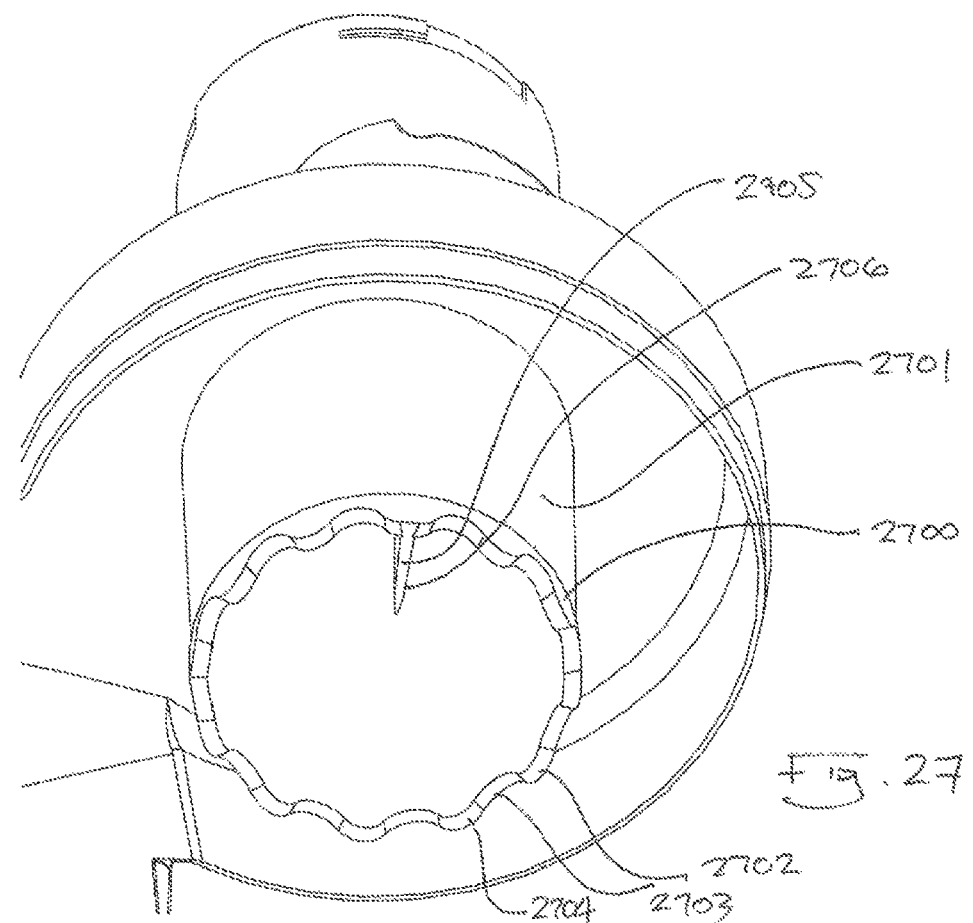
FIG. 27 is an inverted perspective view of a feed tube illustrating a castellated lower end.
Figure 28:
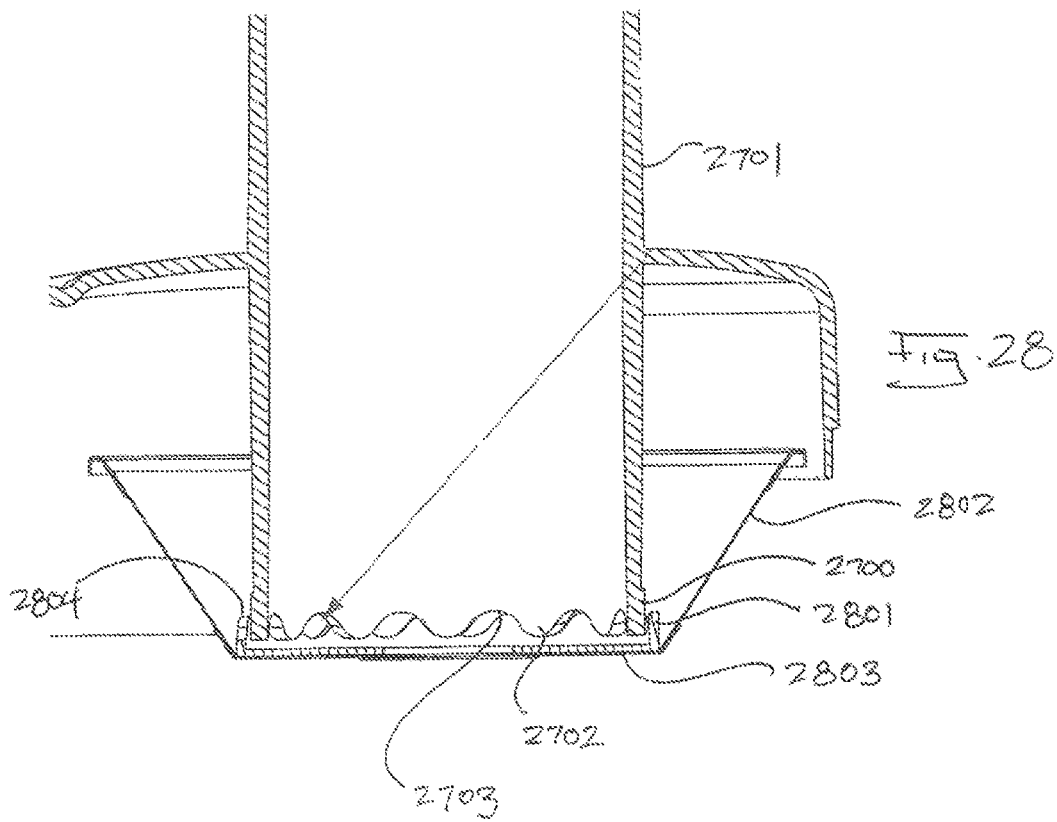
FIG. 28 is a cross-sectional view through a feed tube and grating disc were the lower end of the feed tube is castellated and received by a castellated ring that is carried by the grating disc.

As shown in FIGS. 27-31, the lower end 2700 of a feed tube 2701 may be formed with an array of spaced apart gaps, referred to as castellations 2702. In the example of FIG. 27, the castellations are undulating, comprising alternatively convex and concave regions 2703, 2704. It is preferred that the anti-rotation feature, knife or fin 2705 have its lower edge 2706 coincident with the lowest portion of a convex region of the circumferential castellations. This provides the maximum structural support for the anti-rotation feature 2706 and allows it to be located as low as possible in the feed tube. As shown in FIG. 28, the castellated region 2700 of the feed tube 2701 is received or nested within a castellated shear ring 2801 that is integral with the grating disc and sieve assembly 2802. In preferred embodiments, the castellated shear ring 2801 extends upwardly from the grating disc 2803 and is sized to rotate freely, but closely adjacent (e.g. 1-1.5 mm) to the castellated lower end of the feed tube 2700. As the grating disc and sieve assembly 2802 rotates, pulp and juice pass through the castellations 2700, 2801 and are thereby further processed, sheared, or macerated by the action of the rotating ring 2801 relative to the stationary castellations of the feed tube 2700. When the feed tube 2701, is in position on the juicer, the lowest portion of the castellations 2702 is lower than the top 2804 of the castellated ring 2801.

Figure 29:
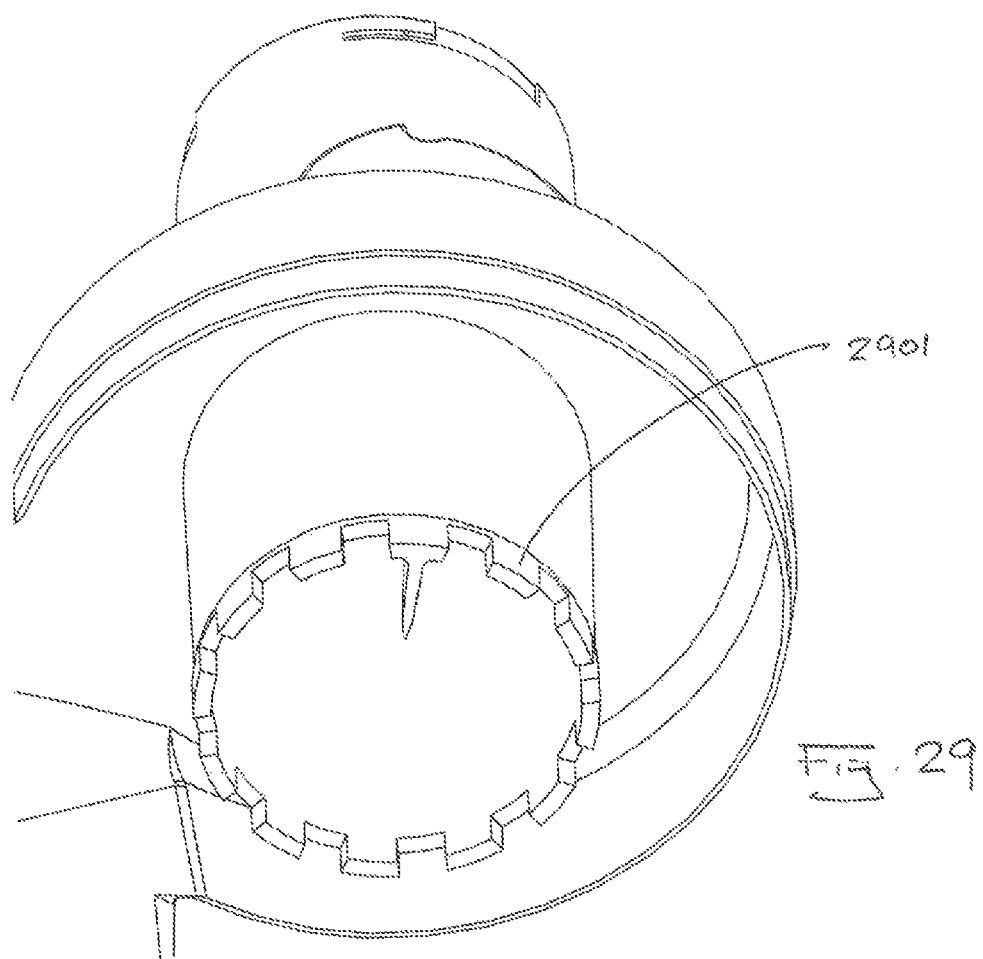
FIG. 29 is an inverted perspective view of a feed tube illustrating a castellated lower end.
Figure 30:
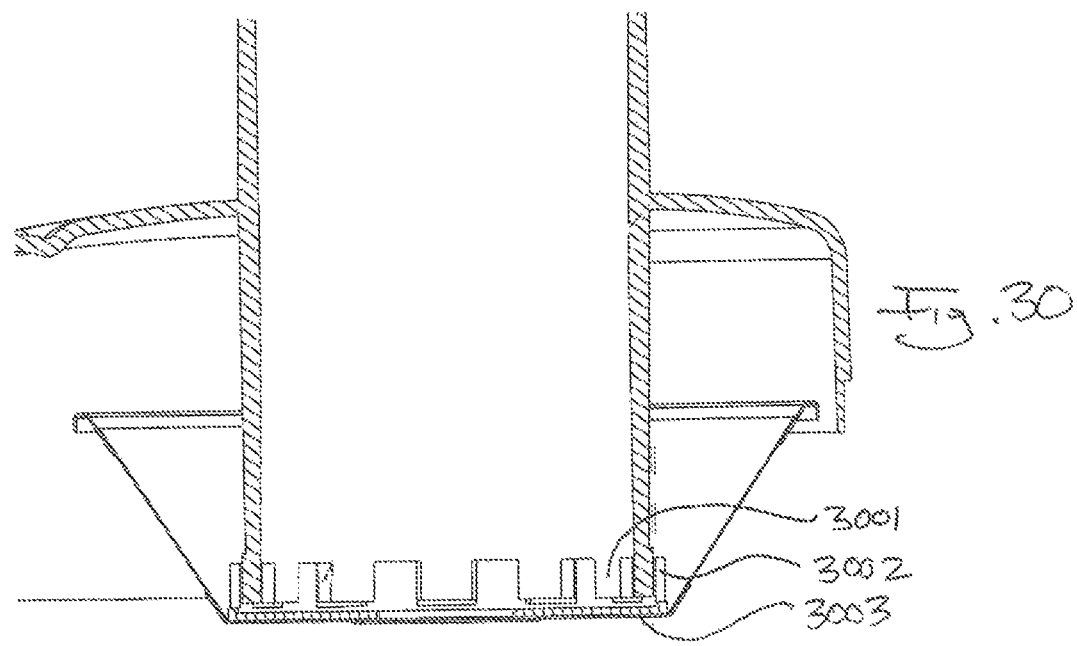
FIG. 30 is a cross-sectional view through a feed tube and grating disc where the lower end of the feed tube is castellated and received by a castellated ring that is carried by the grating disc.
Figure 31:
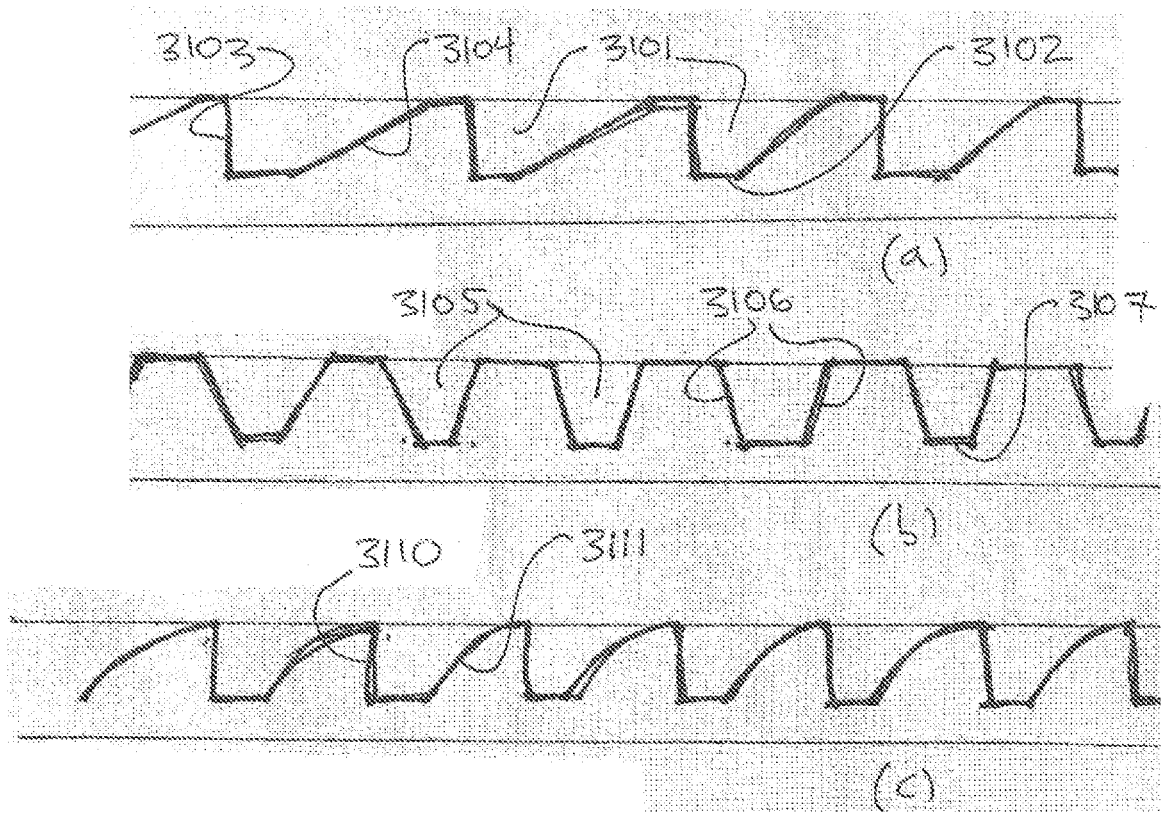
FIG. 31($a$) is a first example of a castellation shape.

As shown in FIGS. 29-31, the castellations 2901 may be square, rectangular or rectilinear, undulating or saw-toothed. As suggested by FIG. 30, the castellations at the bottom of the feed tube 3001 are similar in size and shape to the castellations on the rotating castellated ring 3002. An area on the grating disc 3003 may be devoid of grating teeth or other features to allow adequate vertical clearance for the lower edge of the feed tube's castellations 2901, 3001.

As suggested by FIGS. 31(*a*), (*b*) and (*c*) the castellations may assume a number of different shapes. In FIG. 31(*a*), the castellations form saw teeth 3101 having flattened tips 3102. The leading edge 3103 and the trailing edge 3104 of an individual castellation may be formed at different angles. As shown in FIG. 31(b) the castellations 3105 have sides 3106 of equal angle and length, and in this example have a truncated tip 3107 so as to form a truncated pyramidal shape. As shown in FIG. 31(c) each castellation has one side edge 3110 that is straight and generally parallel with the long axis of the feed tube and another side edge 3111 that is concave so as to form an alternative saw tooth arrangement.

Figure 32:
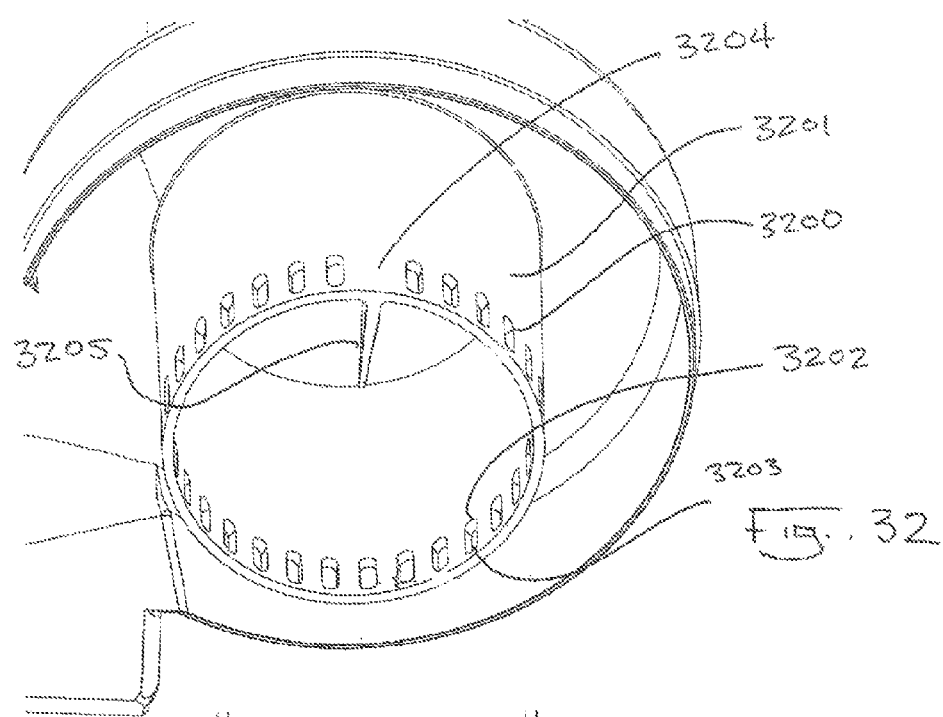
FIG. 32 is an underside perspective of a feed tube having an array of shearing slots.
Figure 34:
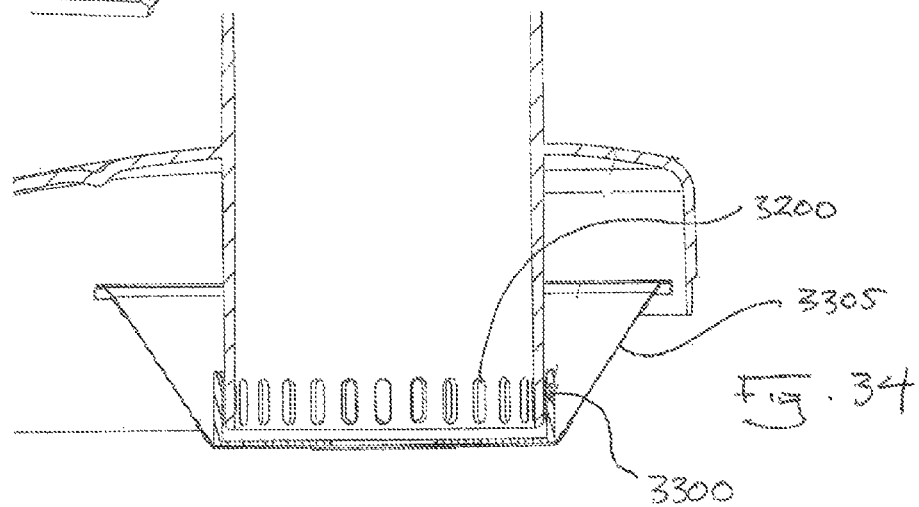
FIG. 34 is a cross-section illustrating a slotted feed tube nested within a slotted shear ring.
Figure 33:
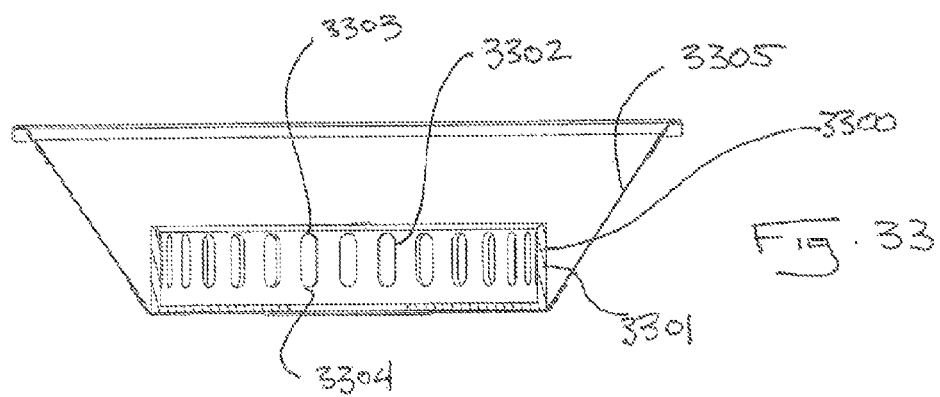
FIG. 33 is a side elevation, cross-sectioned to illustrate a grating disc having a slotted shear ring.

As shown in FIG. 32, an array of through openings or slots 3200 at the lower end of a feed tube 3201 may be used in the same manner as the castellations previously described, for example, with reference to FIGS. 27-31. In this example, the through openings 3200 are elongated, each one having rounded upper and lower ends 3202, 3203. The otherwise equally spaced array of openings 3200 may include an uninterrupted area 3204 in the area of the anti-rotation fin 3205. The array of through openings 3200 may be used in conjunction with a castellated ring or a perforated ring 3300 as shown in FIG. 33. The perforated shear ring 3300 comprises an upright cylindrical wall 3301 in which is formed an array of through openings 3302 that are similar in size and shape to the through openings in the lower end of the feed tube. In this example, the through openings 3302 are oblong, having parallel sides and rounded top and bottom edges 3303, 3304. In some embodiments, the angular spacing between the openings 3302 in the ring 3300 is the same as the spacing between the openings at the lower end of the feed tube 3200. As suggested by FIG. 34, the lower end of the feed tube depicted in FIG. 32 fits within the perforated ring 3300 depicted in FIG. 33. As previously discussed, the rotation of the perforated ring 3300 relative to the stationery lower end of the feed tube creates a shearing action in the gap between the feed tube and the ring. It will be appreciated that although the examples of FIGS. 32-34 depict an upright of conventional frusto-conical sieve 3305, the same arrangement may also be employed with respect to an inverted frusto-conical sieve.

Figure 35:
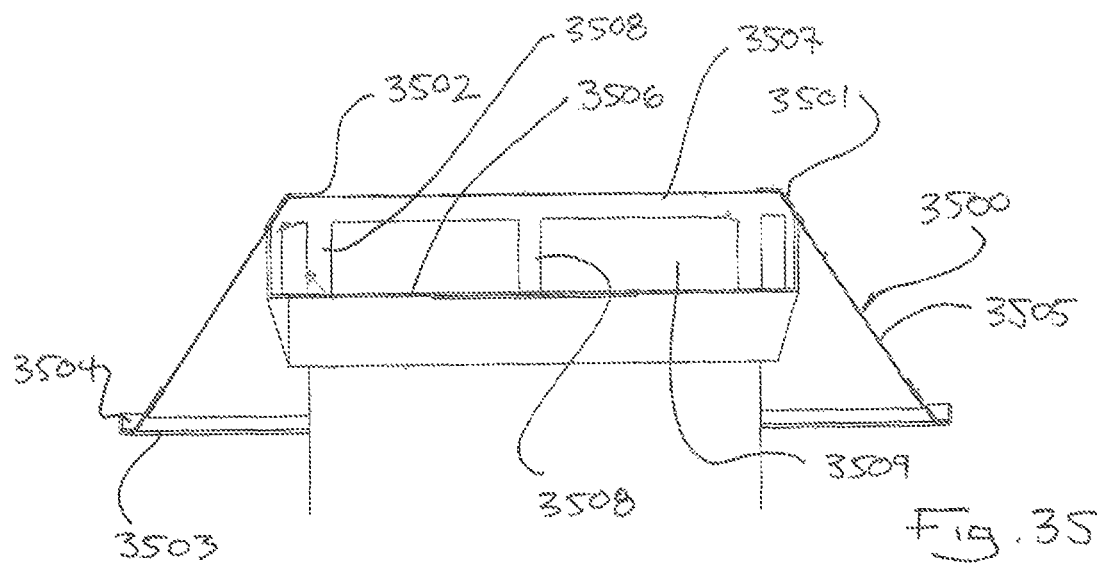
FIG. 35 is a cross-section of a grating disc and inverted sieve assembly.

As shown in FIG. 35, an inverted frusto-conical sieve 3500 comprises a toroidal upper filter frame ring 3501 whose inner edge 3502 defines a circular opening for receiving the lower end of a feed tube. The inverted sieve 3500 further comprises a bottom filter frame ring 3503 having a rigidising lip 3504. The perforated sieve 3505 extends between the upper filter frame ring 3501 and the bottom filter frame ring 3503. The upper portion of the sieve 3505 and the upper filter frame ring 3501 are elevated above and connected to the grating disc 3506 by a cylindrical frame 3507 having optional upright struts 3508. Through openings 3509 between the struts 3508 allow juice and pulp to be ejected toward the sieve 3505.

Figure 36:
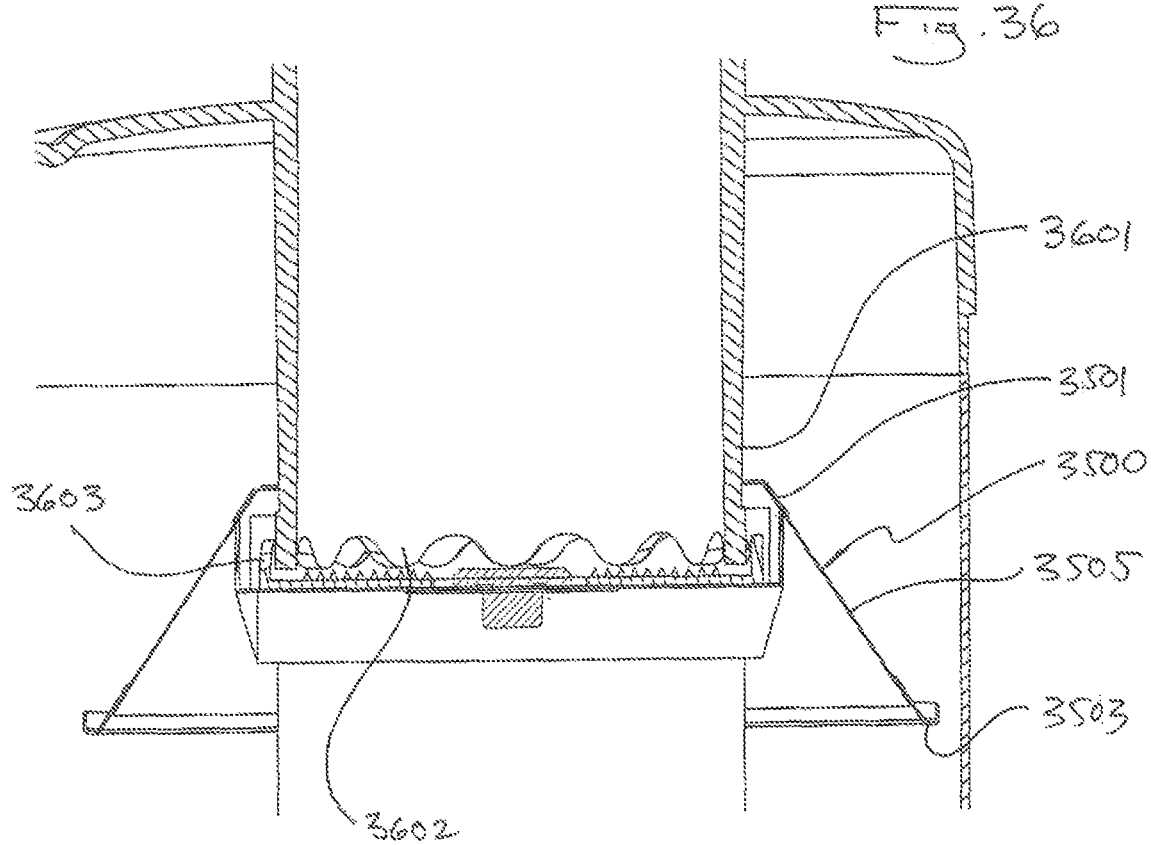
FIG. 36 is a cross-section of a grating disc and inverted sieve assembly having a castellated ring in conjunction with a castellated lower end of a feed tube.

As shown in FIG. 36, the lower end of a feed tube 3601 is admitted past the upper filter frame ring 3501. The castellations or slots 3602 at the lower end of the feed tube come to rest or are nested within the castellated or slotted ring 3603 that is part of the grating disc and sieve assembly.

Figure 37:
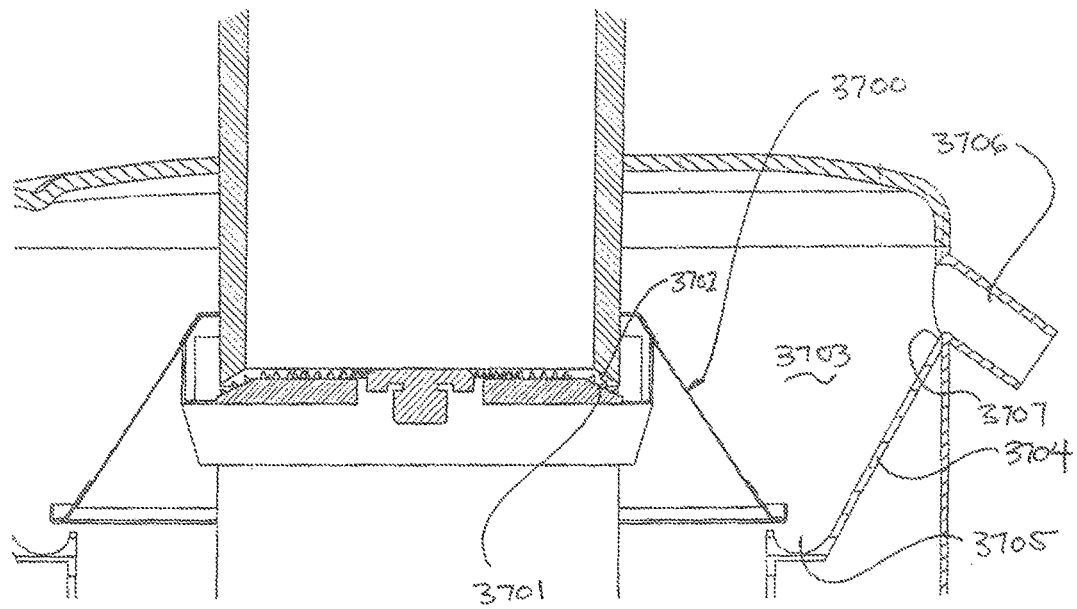
FIG. 37 is a cross-section illustrating an inverted sieve arrangement in conjunction with an elevated spout.
Figure 38:
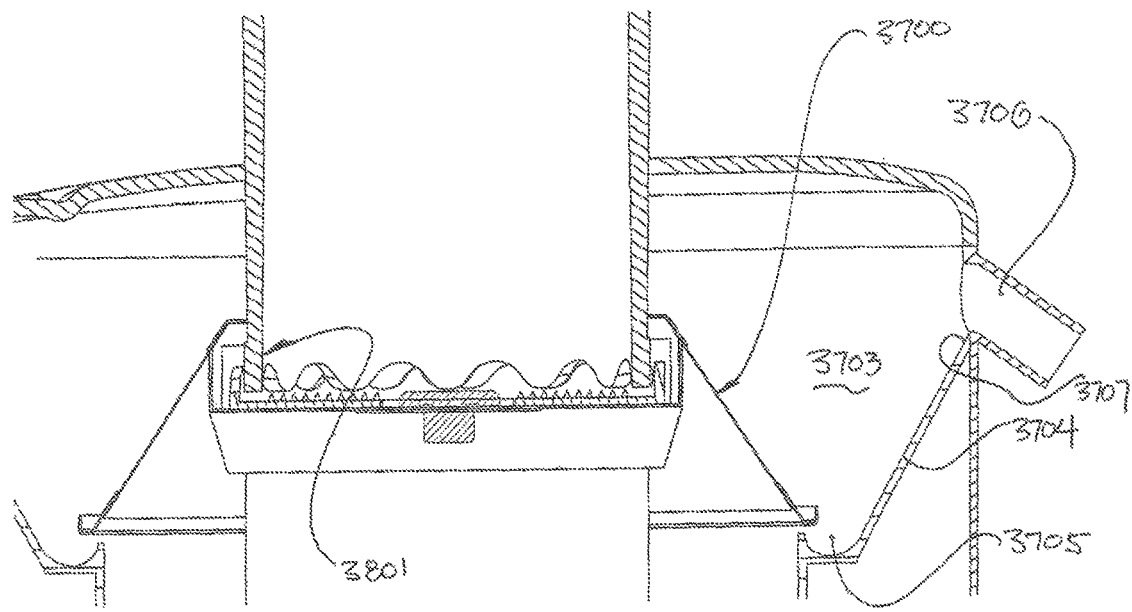
FIG. 38 is a cross-section illustrating an inverted sieve arrangement in conjunction with an elevated spout.

As suggested with reference to FIGS. 37 and 38, an inverted frusto-conical sieve assembly 3700, with or without features such as the secondary processing surface 3701, throttling channel 3702 or the aforementioned arrangement of castellated or slotted, rings 3801 may be combined, in a centrifugal juicer, with a juice collection chamber 3703 having tapered or frusto-conical side walls 3704. In the examples of FIGS. 37 and 38, the frusto-conical side wall 3704 of the juice collection chamber 3703 form a circumferential trough 3705. A juice discharge spout 3706 is formed at the upper extent of the frusto-conical wall 3704 of the juice collection chamber 3703. Airflow within the juice collection chamber 3701, induced h the rotation of the grating disc and sieve arrangement 3700 will act to drive the contents of the juice collection chamber 3703 upward and along the frusto-conical wall 3704. Thus, juice reaching the upper edge 3707 of the frusto-conical outer wall 3704 of the juice collection chamber 3703 will enter into and be dispensed from the spout 3706. Utilising the airflow within the juice collection chamber 3703 to lift the juice against the force of gravity and into an elevated spout 3706 allows a taller collection vessel to be located under the spout 3706. This may allow a greater volume of juice collection than would otherwise be expected.

As shown in FIG. 39, a conventional frusto-conical sieve 3901 may also be combined with a juice collection chamber 3902 having a tapered or frusto-conical side wall 3903 in accordance with the teachings provided, by way of FIGS. 37 and 38, a discharge spout 3904 is located adjacent to the upper margin 3905 of the collection chambers side wall 3903, thus providing an enhanced juice collection capacity. In the example of FIG. 39, the spout 3904 is located at about the same level as the upper rim 3906 of the frusto-conical sieve 3901.

As shown in FIGS. 40 and 41, the individual teeth 4000 on a grating disc 4001 are formed by driving a tool 4002 into the upper surface 4003 of the disc 4001. Driving the tool into the disc has the effect of raising the tooth 4000. The tool 4002 also creates an indentation 4004 in the disc. Part of the indentation 4005 forms a recess or concavity into the front face 4006 of the tooth 4000. The indentation also forms a pocket 4007 both below and in front of the front surface 4006 of the tooth. As shown in FIG. 41, the front edge of the tooth 4000 comprises an outer edge 4009, an inner edge 4006 and the tooth's apex 4008 between them.

Figure 42:
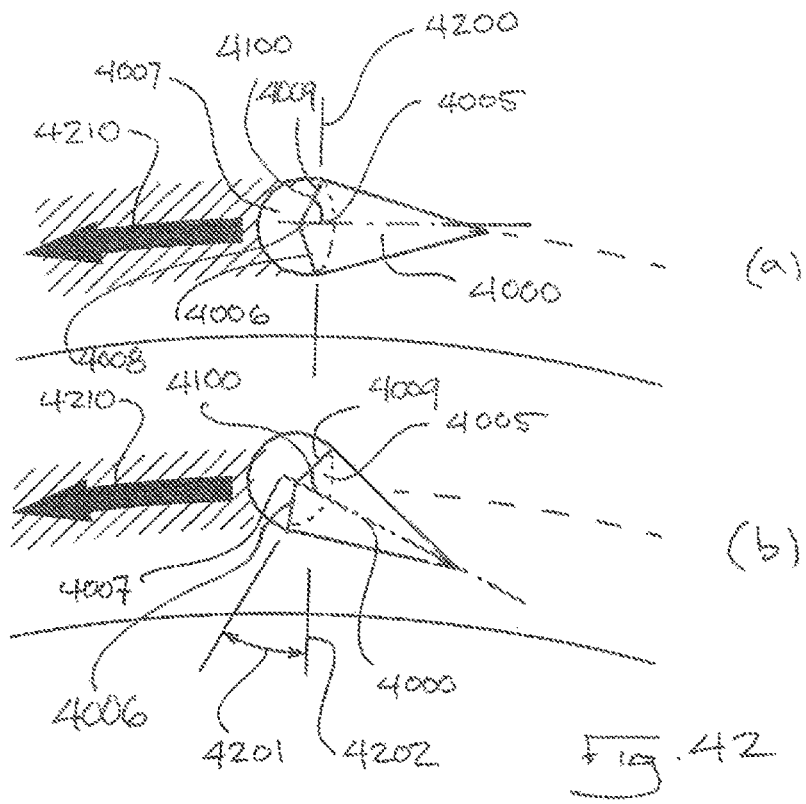
FIG. 42($a$) is a top plan view of a conventional tooth on a grating disc.
Figure 43:
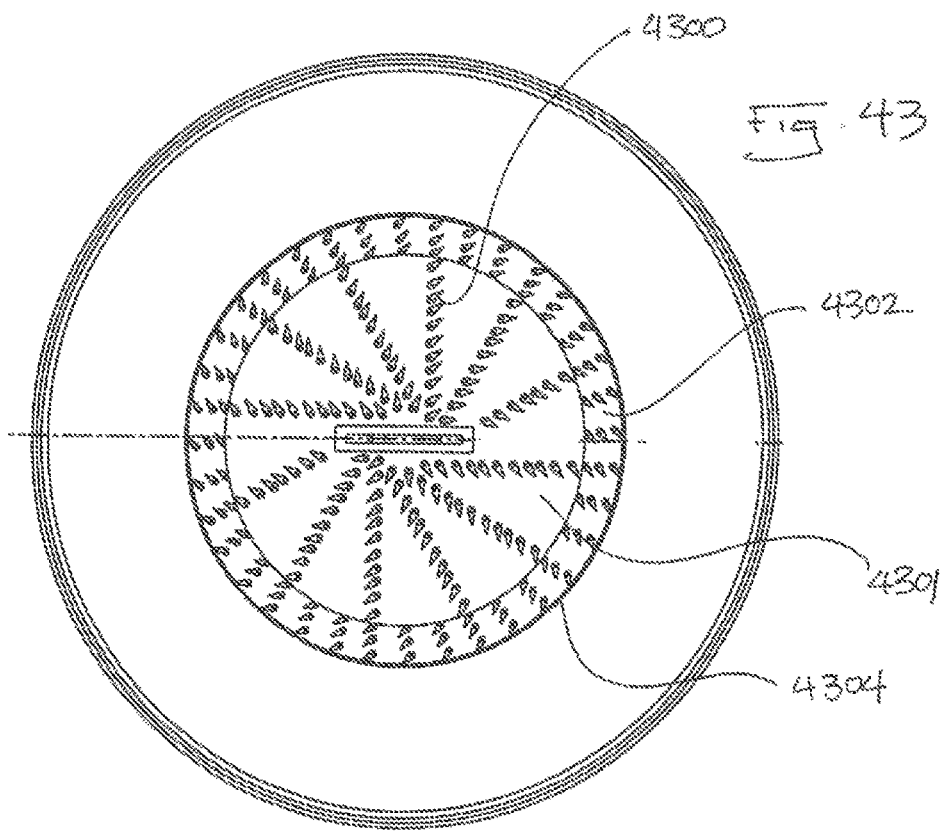
FIG. 43($b$) is a top plan view of a tooth on a grating disc that is angled with respect to the radius of a grating disc.

Each tooth has a longitudinal axis 4100 that passes through the tooth's apex 4008. Conventionally the longitudinal axis 4100 is tangential to the circle of rotation of the tooth as shown in dotted form in FIG. 42(a). However, beneficial results in terms of juicing efficiency and shedding of unwanted food fibers etc. may be obtained by inclining or rotating the longitudinal axis of the teeth to either side of the tangent 4210. As shown in FIG. 42(b) the longitudinal axis 4100 has been rotated clockwise relative to the circle of rotation shown in dotted form (looking down at the tooth). The tooth in FIG. 42(a) is considered outward facing, that is, the front recess of the tooth 4005 faces more toward the outside edge of the disc than a conventional tangential oriented tooth. Inward facing teeth are depicted. In FIG. 43, the longitudinal axis being inclined so that front recesses face the rotational center of the disc more than conventional tangentially oriented teeth.

In the conventional orientation, the inner and outer edges contact the food being juiced at approximately the same time. For an outward facing tooth, the inner edge 4006 will make contact slightly before the outer edge 4009. Thus the inner edge is considered the leading edge in an outward facing tooth and the outer edge is considered the tailing edge of the tooth.

For an inward facing tooth the outer edge 4009 will make contact before the inner edge 4006. Thus the outer edge of an inward facing tooth is considered the leading edge and the inner edge is considered the tailing edge of the tooth.

As suggested by FIG. 43, the individual teeth 4300 on either or both of the primary or secondary processing surfaces 4301, 4302 may be orientated inwardly, that is, facing radially inward toward the centre of rotation of the grating disc 4304. It will be appreciated that the inward or outward reorientation of the teeth is best employed by having all of the teeth on a grating disc 4304 similarly orientated. It will also be appreciated that the inward or outward facing teeth may be used in place of any or all of the teeth on any grating disc having teeth. The way individual teeth are formed is considered conventional other than in the way the teeth are oriented as to face either inward or outward.

Figure 44:
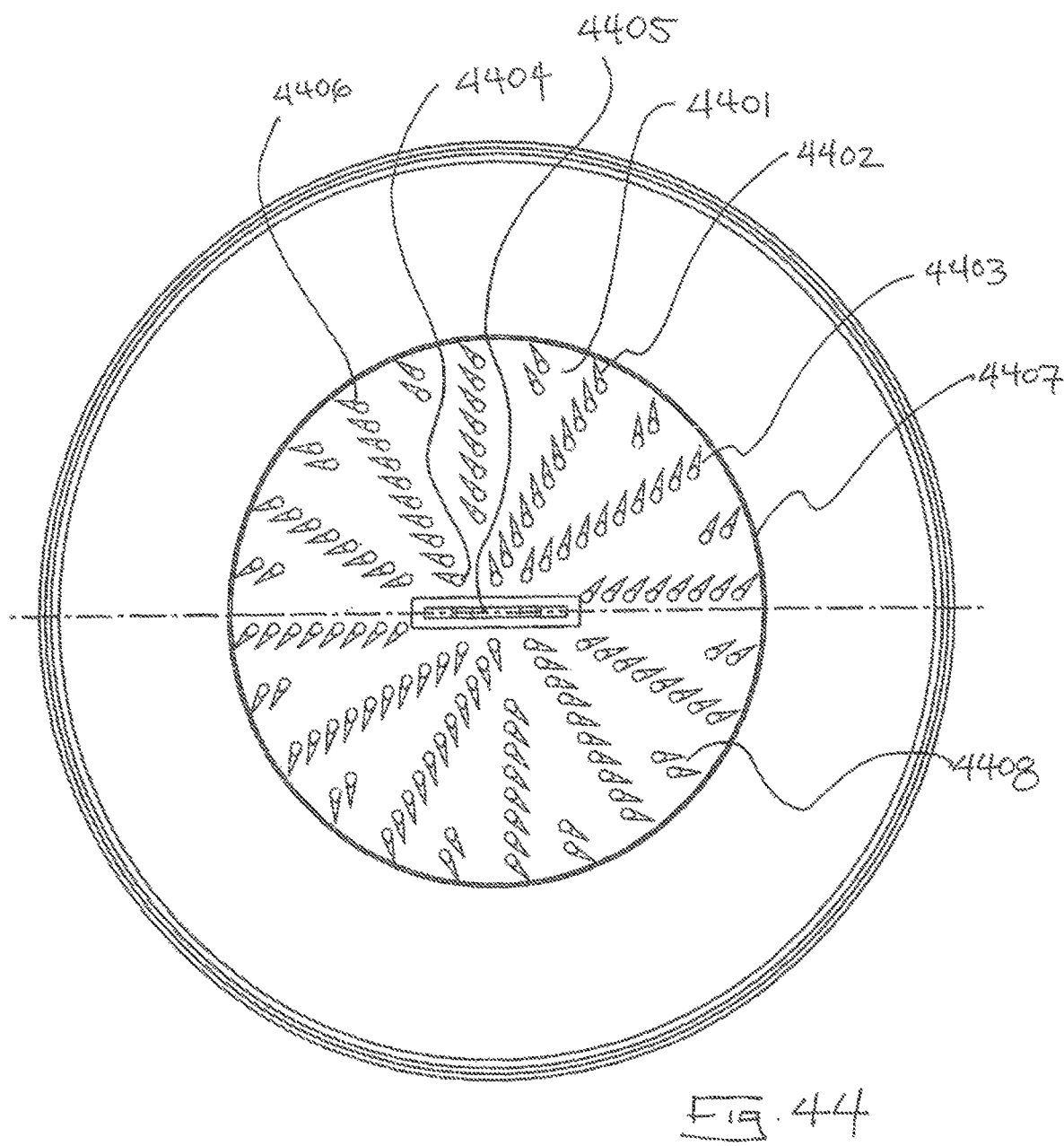
FIG. 44 is a top plan view of a grating disc having teeth that are oriented radially inward.

As shown in FIG. 44, a flat grating disc 4401 is provided with inward facing cutting teeth 4402. In this example, the teeth are arranged in 12 primary linear and generally radial rows 4403. Each row extends from an innermost tooth 4404 that is adjacent to the central coring knife 4405 to an outer tooth 4406 that is adjacent to the perimeter 4407 of the upper surface of the disc. Also in this example, a pair of interstitial teeth 4408 is provided between adjacent primary rows 4402. The 12 interstitial pairs are located adjacent to the aforementioned perimeter 4407.

Figure 45:
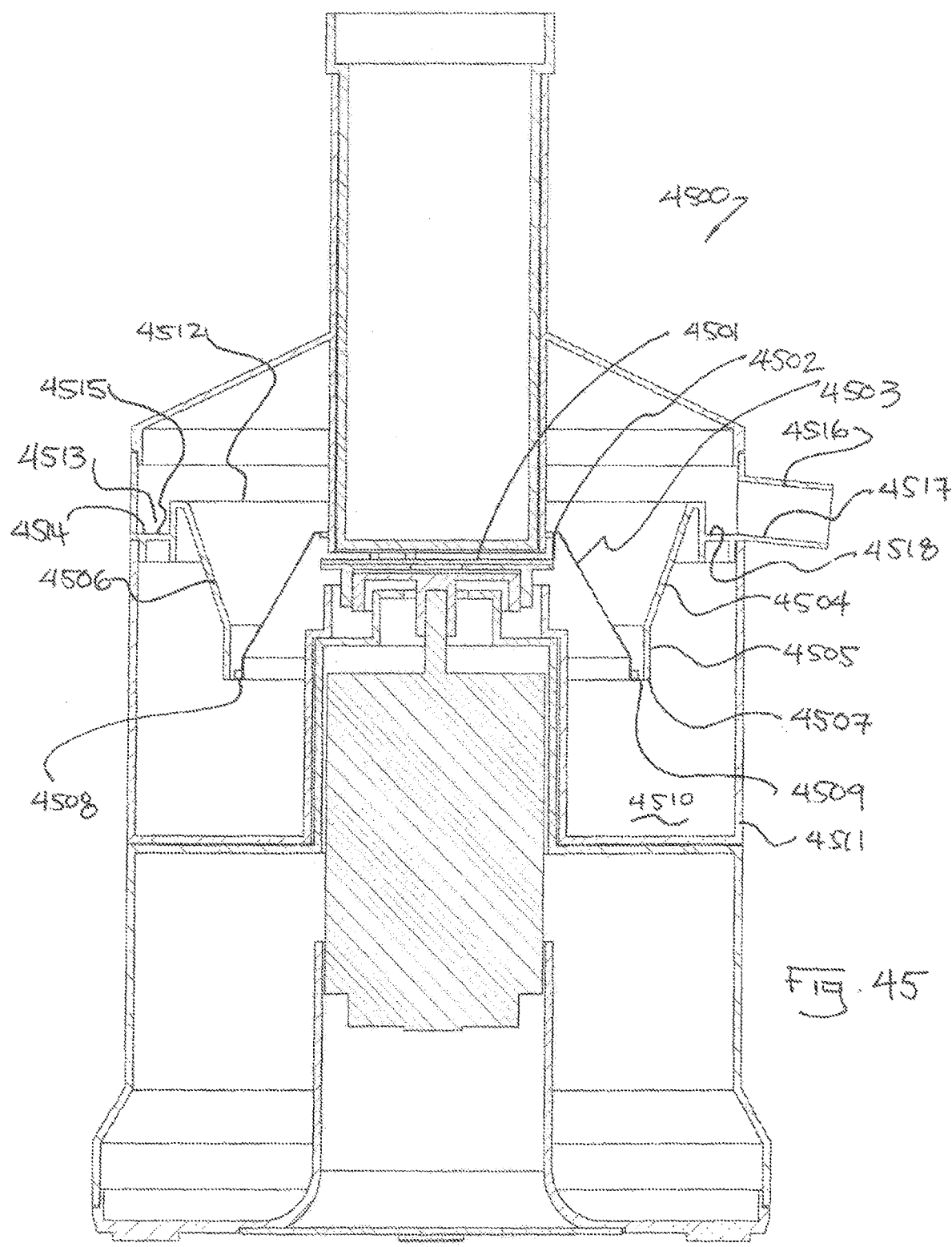
FIG. 45 is a cross sectional view of a fruit and vegetable juicer having an inverted sieve an elevated nozzle.

As shown in FIG. 45, a centrifugal juicer 4500 has to grating disc 4501 that is affixed to and supports the upper rim 4502 of an inverted frusto-conical sieve 4503. The sieve 4503 is surrounded by a stationary juice collection ring 4504. In this example, the juice collecting ring 4504 comprises a generally cylindrical lower section 4505 and an upper or tapered portion 4506. The lowest edge 4507 of the juice collector is adjacent to the lowest edge 4508 of the sieve. A circumferential gap 4509 between the sieve and the juice collector allows pulp to fall into the interior 4510 of a pulp collection chamber 4511. Juice that is ejected through the sieve is carried up the inclined walls of the upper portion 4506 owing to the velocity of the ejected juice together with the movement of air induced by the rotation of the grating disc and sieve. Extracted juice is propelled over the upper edge 4512 of the juice collector and then fails into a circumferential trough 4513 that surrounds the upper extremity of the juice collector. In this example, the trough 4513 has an inclined floor 4514 with the high point 4515 of the floor of the trough being diametrically opposite to the juicer's dispending nozzle 4516. Thus, juice accumulating in the trough 4513 will flow toward and out of the nozzle 4516. In this example, the low point of the interior of the nozzle 4517 is in alignment with the lowest part 44518 of the trough. In this example, the juice collector and circumferential trough are integrally formed. The lowest interior surface of the nozzle 4517 is located vertically above the grating disc and is closer to the upper rim 4512 of the juice collector than the lower rim 4507.

Figure 46:
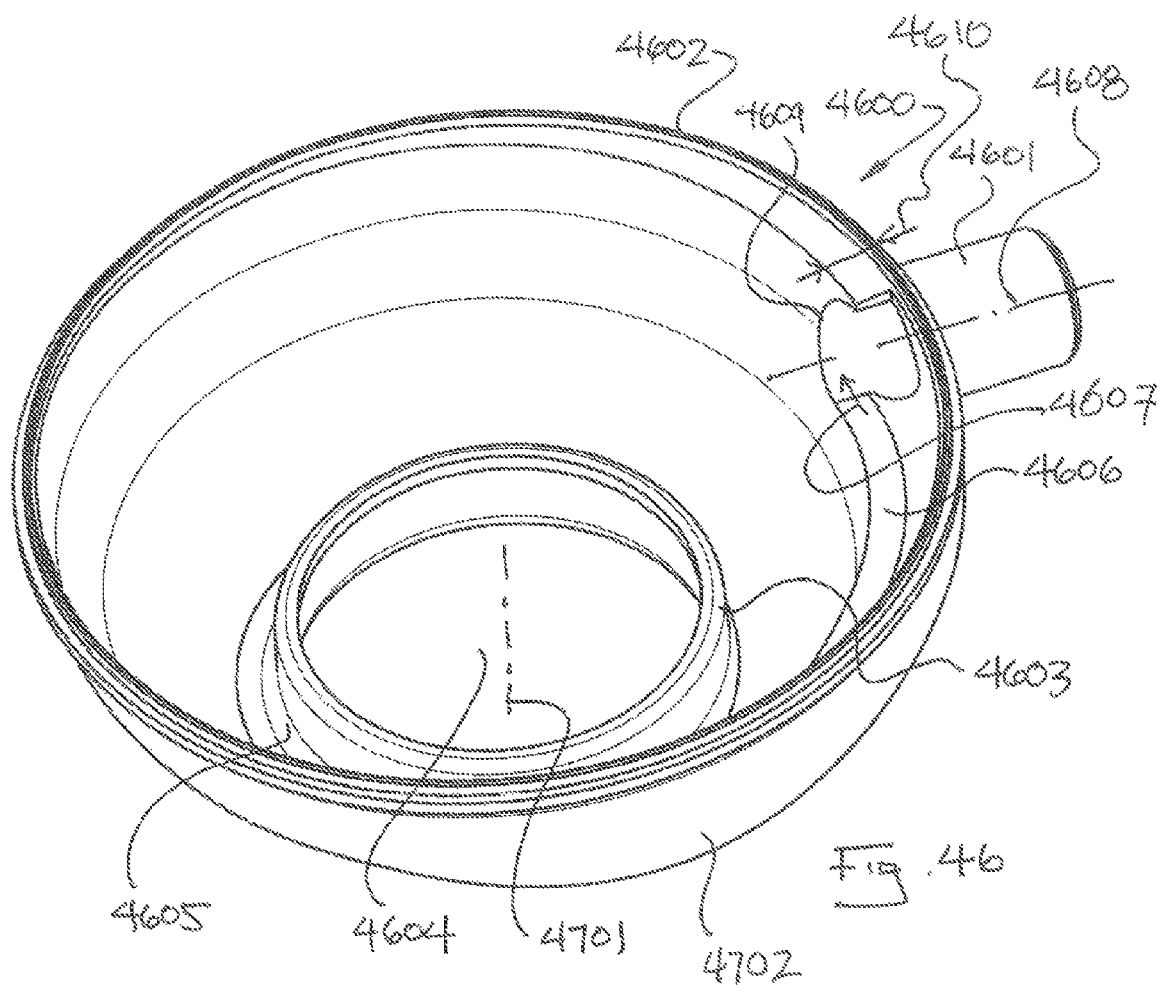
FIG. 46 is a perspective view of a juice collector with an internal helical ramp.

As shown in FIG. 46, a juice collection chamber 4600 is howl shaped, having an elevated nozzle 4601 located adjacent to the upper rim 4602 of the chamber 4600. In this example, the juice collection chamber 4600 has an internal vertical collar 4603 that defines a central opening 4604. The opening allows the grating disc located within the juice collection chamber to be attached to the motor below the juice collection chamber. An area at the base of the neck 4605 defines an interior floor of the juice collection chamber. A helical ramp 4606 extends from the floor 4605 to the elevated nozzle 4601. The wall thickness of the juice collector around the nozzle is thickened to allow the ramp 4606 to enter the interior of the nozzle 4601 in a direction 4607 that is transverse or perpendicular to the longitudinal axis 4608 of the nozzle 4601. The thickening of the walls presents an entry or backstop to the flow into the nozzle in the form of an approximate half cylinder 4609 having a length corresponding approximately to the wall thickness 4610 in the area of the nozzle 4608.

Figure 47:
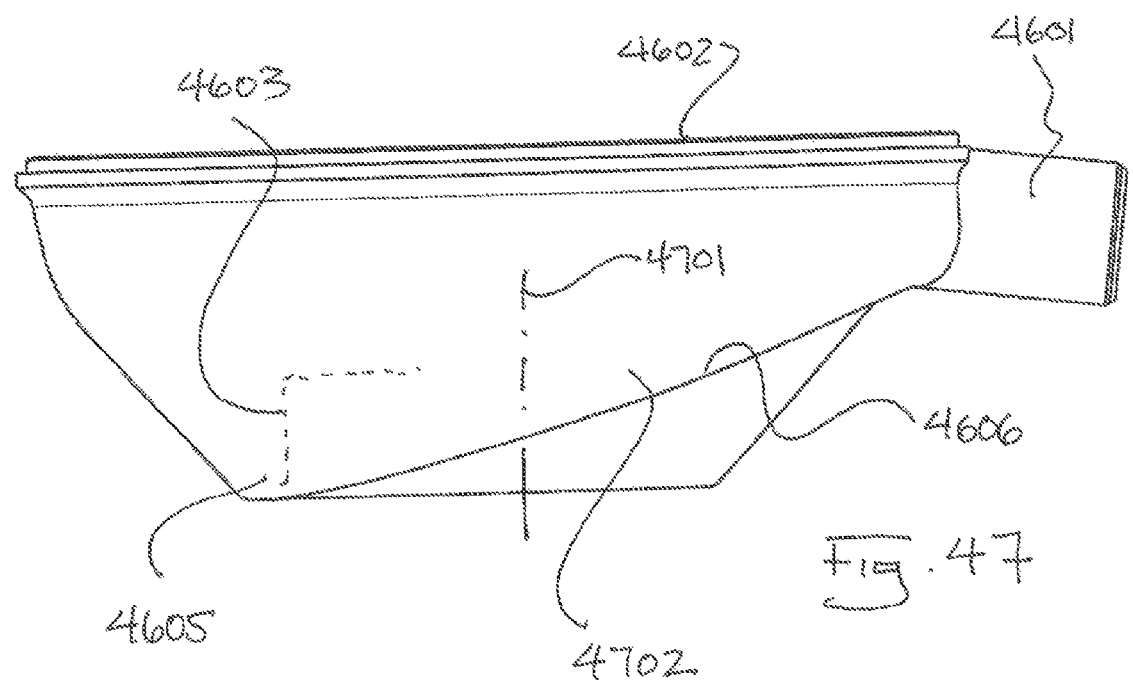
FIG. 47 is a side elevation of the juice collector depicted in FIG. 46.

As suggested by FIG. 47, the effective radius of the ramp 4606 (measured from the rotational centre line of the grating disc 4701) may be increased by forming a bulge 4702 in the side wall of the juice collector. Increasing the effective radius of the helical ramp 4606 tends to slow the velocity of the juice down prior to it entering the nozzle 4601.

Figure 48:
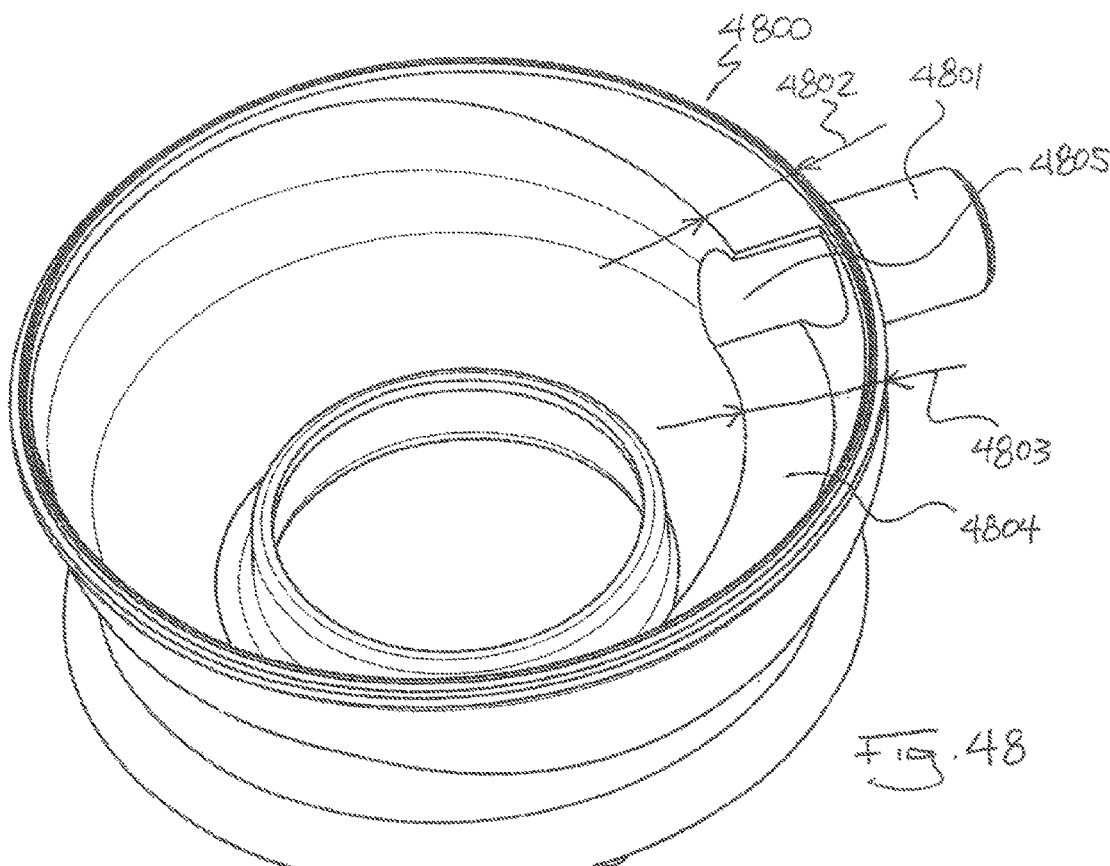
FIG. 48 is a perspective view of a juice collector with a thickened side wall near the discharge nozzle.
Figure 49:
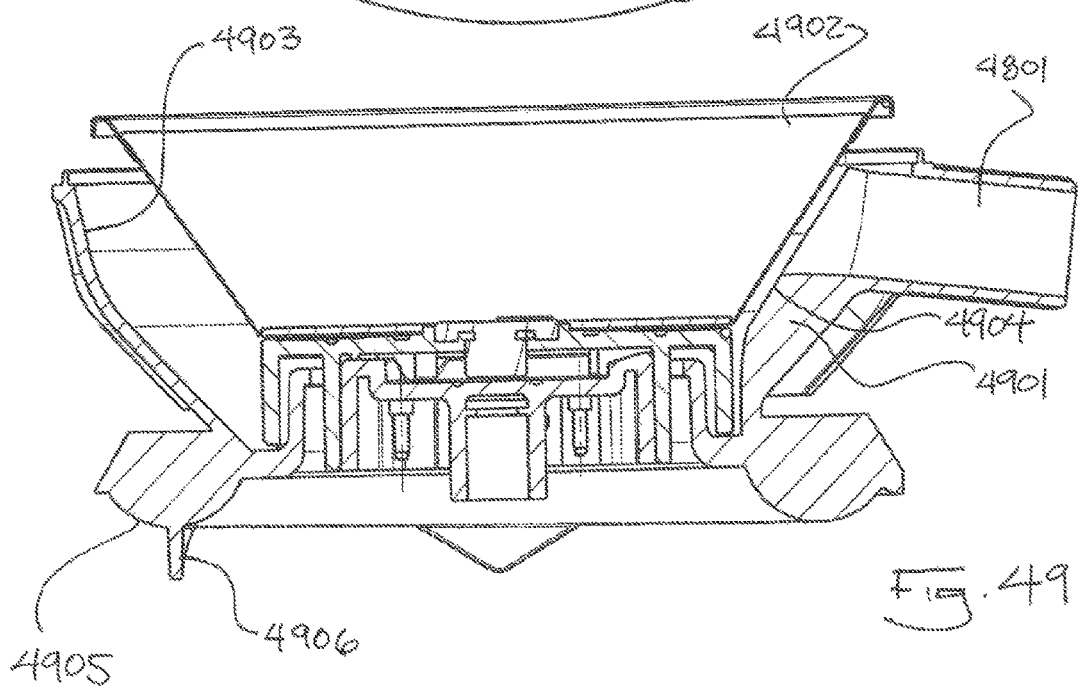
FIG. 49 is a cross sectional view of the juice collector shown in FIG. 48.

As suggested by FIGS. 48 and 49, a juice collector 4800 may have a side wall that is thickened in the area to either side of the elevated nozzle 4801. In this example, providing a thickening in the side wall to either side 4802, 4803 of the elevated nozzle 4801 (4901 in FIG. 49) provides several advantages. First, it provides for a wider helical ramp 4804, particularly in the area of the nozzle 4801. Second, it provides for a wider semi-cylindrical entry 4805 into the interior of the feed tube 4801. Third, it locates the interior surface of the juice collector in the area of the nozzle 4801 to be closer to the frusto-conical sieve 4902 than other interior surfaces 4903 of the juice collector. By locating portions of the interior surface 4904 (that are close to the nozzle 4801) to be close to the outer surface of the sieve 4902, recirculation is limited. Juice will generally make only a single full rotation of the interior of the juice collector after extraction before it is forced out of the nozzle by the helical ramp 4804. FIG. 49 also illustrates that the juice collector has an underside mounting ring 4905 with one or more downward facing vertical projections 4906 that facilitate the installation of the juice collector into the juicer, as is well known in this art.

Figure 50:
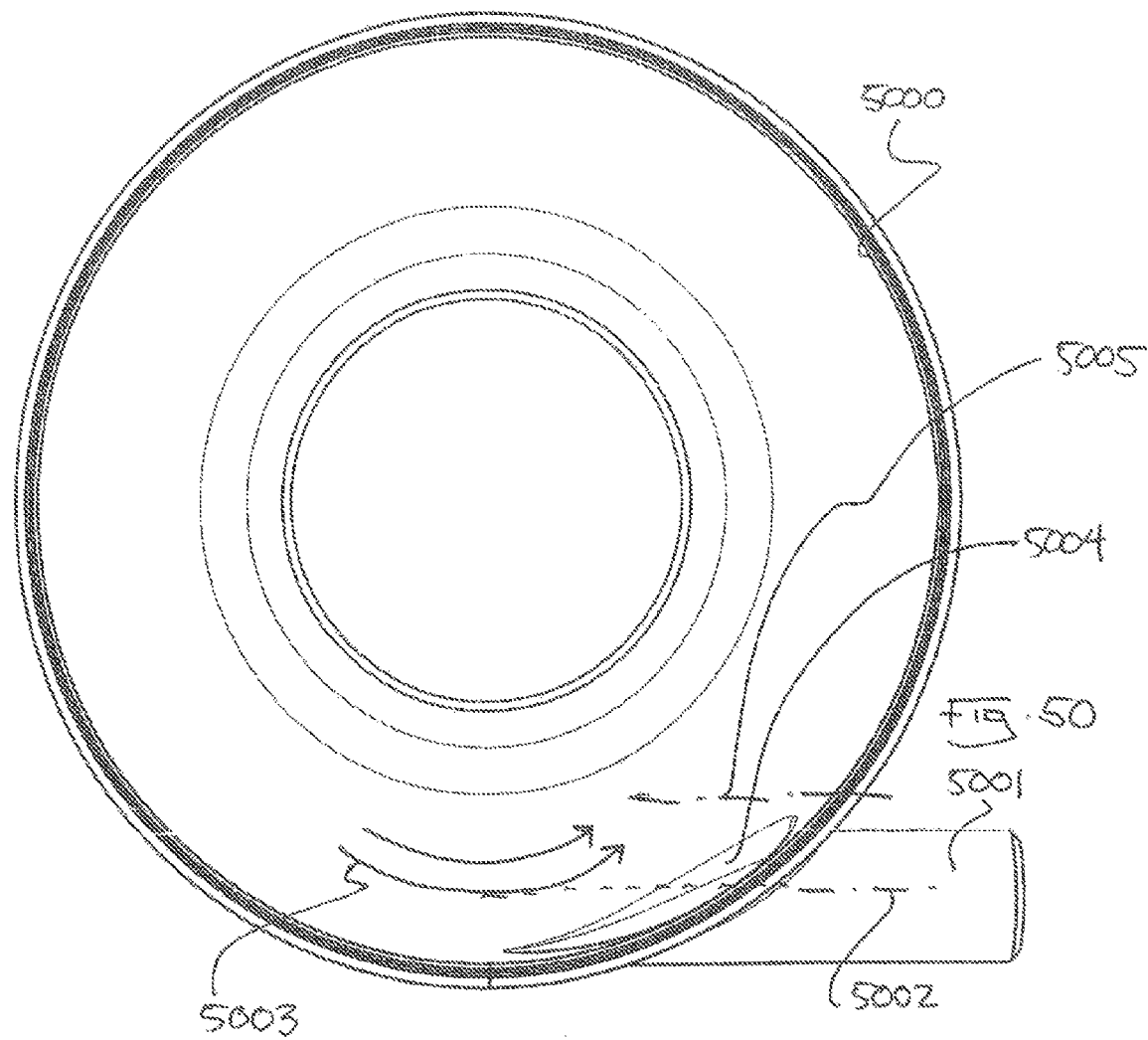
FIG. 50 is a top plan view of a juice collector having a tangential discharge nozzle.
Figure 51:
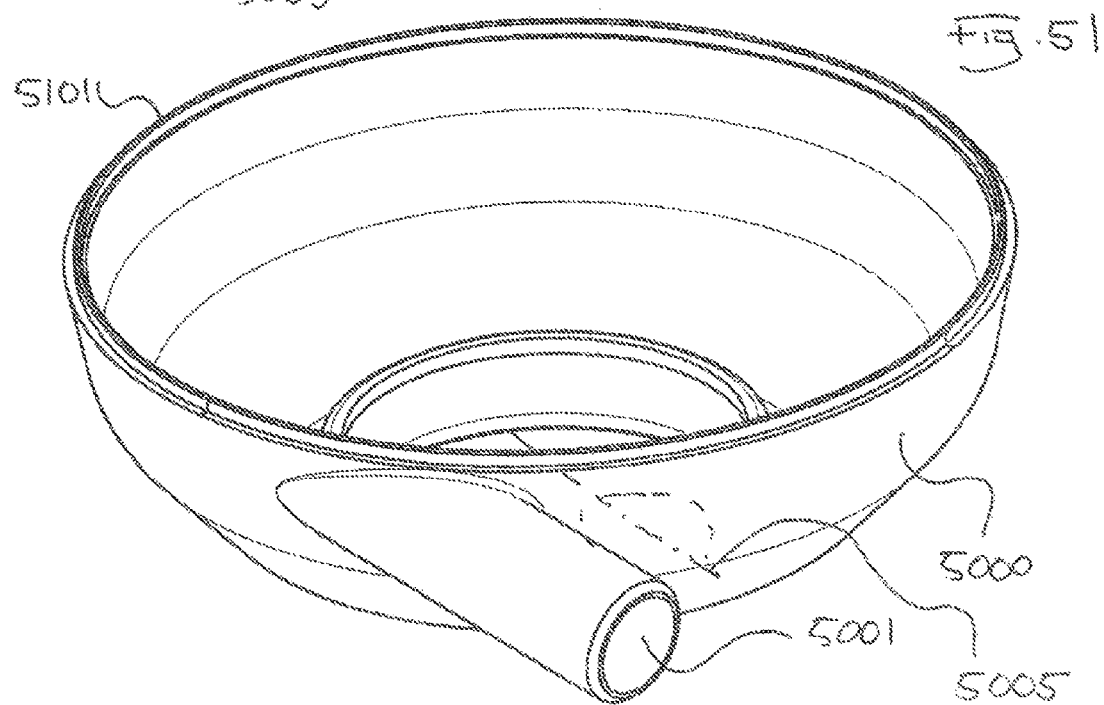
FIG. 51 is a perspective view of the juice collector shown in FIG. 50.

FIG. 50 illustrates a juice collector 5000 having an elevated and tangentially oriented spout 5001. In this example, the longitudinal axis 5002 of the spout forms a tangent with a circle 5003 that describes a path or flow of the juice circulating within the juice collector. This provides for an ovulate, elliptic or ovoid shaped entry opening 5004, having a larger total entry area than the radially extending spouts, shown for example, in FIGS. 1, 46 and 48. In preferred embodiments, the nozzle 5001 is downwardly inclined with reference to the horizontal and more particularly the horizontal plane in which the rim 5101 of the juice collector is contained. In this example, the nozzle is essentially cylindrical although it may be tapered in either direction. It will be appreciated that the tangentially oriented nozzle 5001 shown in FIG. 50 may have its longitudinal axis laterally offset 5005 and still be considered tangential with reference to the shape of the juice collector and the flow of liquid within it.

Figure 52:
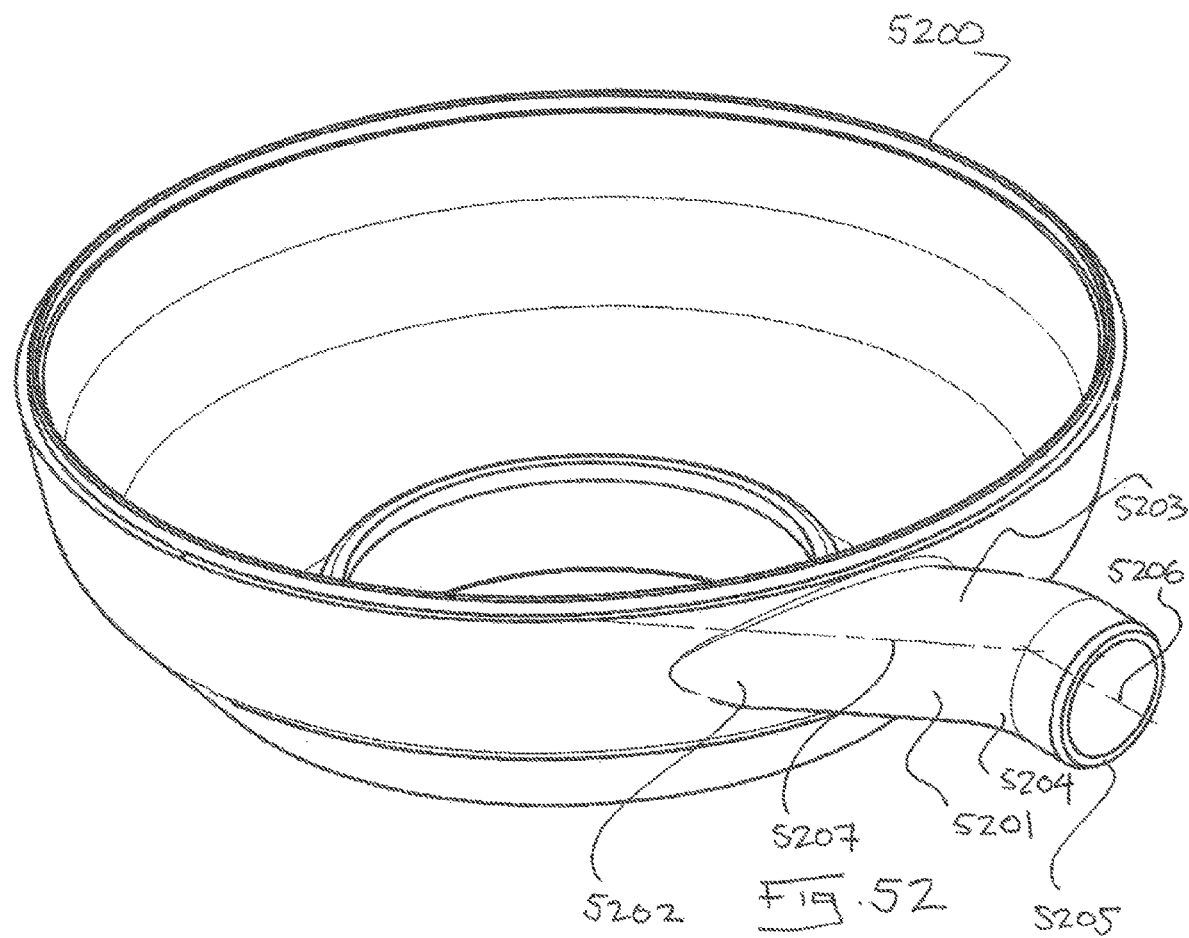
FIG. 52 is a perspective view of a juice collector having a discharge nozzle with a tangential inlet, and radially oriented discharge opening.

As shown in FIG. 52, a juice collector 5200 may have a discharge nozzle 5201 having an inlet 5202 and body portion 5203 that are tangential to the flow direction and also have a bend 5204 that results in a radially directed discharge opening 5205. In this example, the nozzle terminates in a circular discharge opening 5205 that is perpendicular to a radius 5206 that extends towards the centre of the juice collector. Accordingly, the nozzle has a tangential entry portion and a discharge portion that is radial 5206. The nozzle 5203 is preferably inclined downwardly for ease of dispensing.

Figure 53:
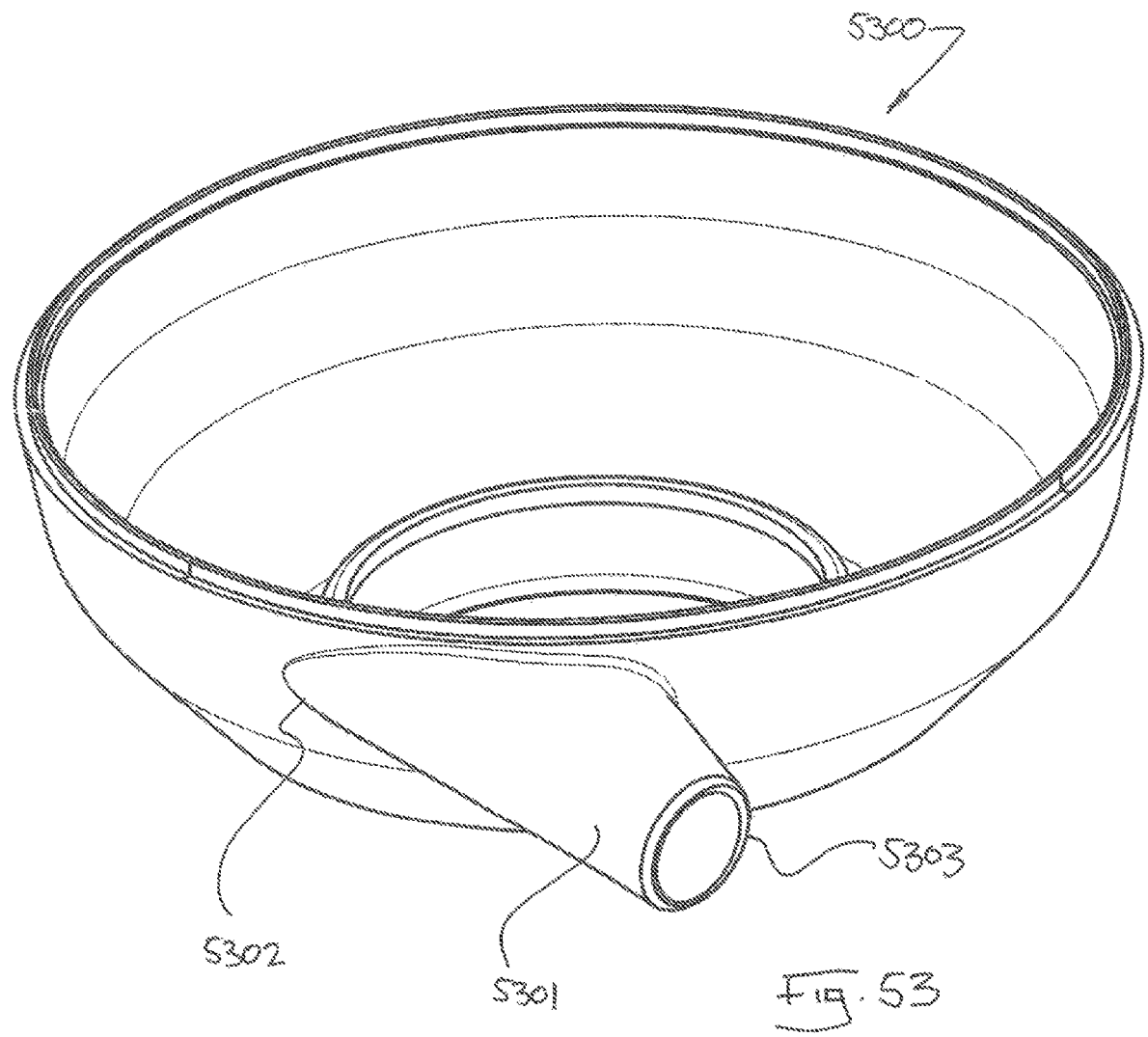
FIG. 53 is a perspective view of a juice collector with a tapered discharge nozzle.

As shown in FIG. 53, as juice collector 5300 has an elevated and tangential discharge nozzle 5301 that is tapered. The nozzle tapers from a maximum cross sectional area at its tangential inlet 5302 to a minimum cross sectional area at the discharge opening 5303. The tapering of the nozzle toward a smaller cross sectional area is thought to cause the pressure and turbulence in the discharged air flow to increase. This makes it relatively harder for air to escape, without excessively disrupting the discharge of liquid from the interior of the juice collection chamber. This results in a juice with less foam while still maintaining high rates of juice extraction. In this example, the discharge opening 5303 is circular, but it may take other shapes as well.

Figure 54:
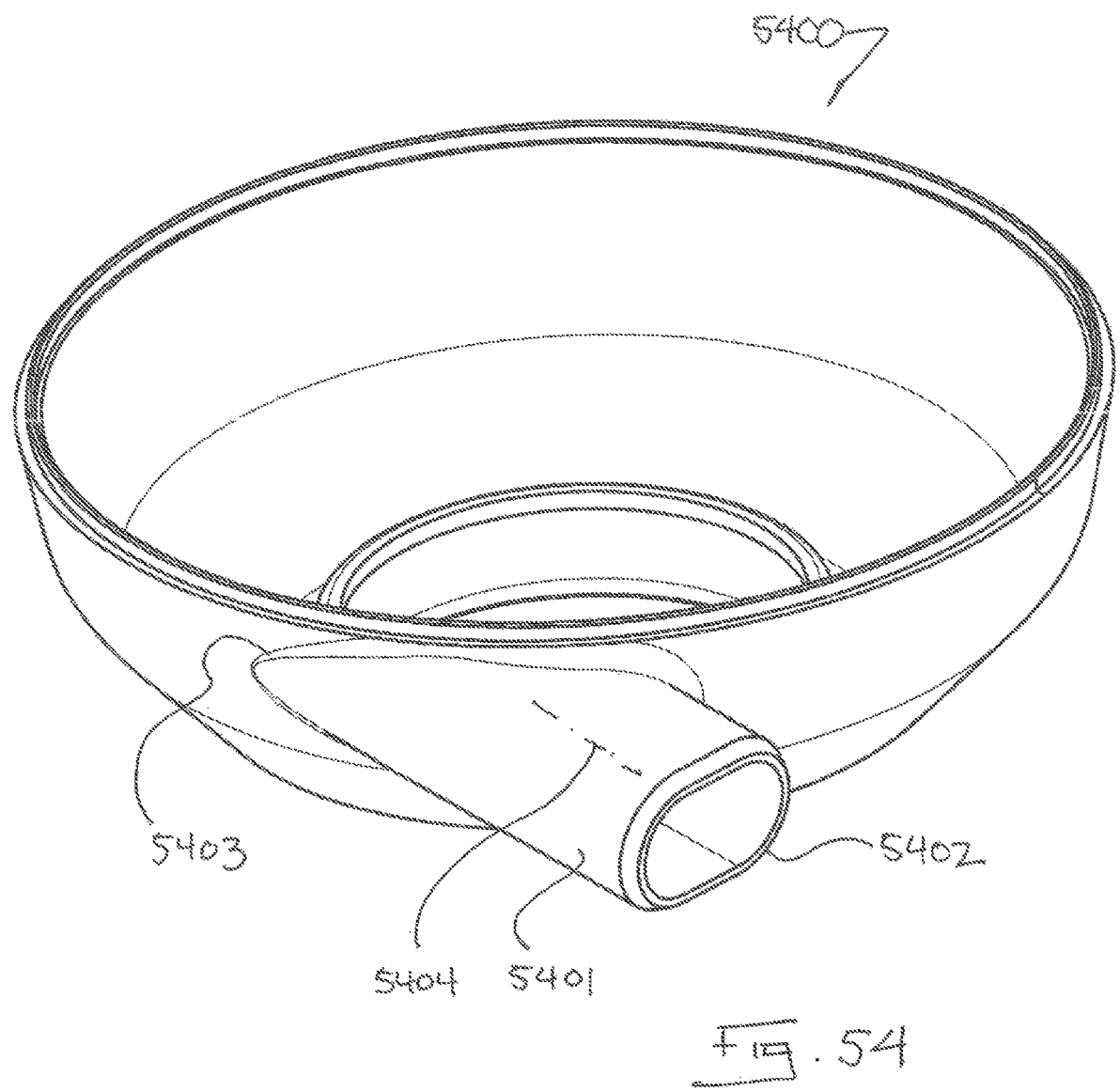
FIG. 54 is a perspective view of a juice collector with an ovoid and tangential discharge nozzle.

In the example of FIG. 54, a juice collector 5400 has an elevated and tangential discharge nozzle 5401 that is ovoid or elliptical in cross section and having an ovoid or elliptical discharge opening 5402. In this example, the shape of the discharge opening 5402 is essentially constant in cross sectional area and a projection of the nozzle's intake opening 5403 as seen along the longitudinal axis 5404 of the nozzle 5401. The increased cross sectional area of the discharge opening 5402 results in lower pressure within the nozzle, allowing juice to escape the collector more easily.

Figure 55:
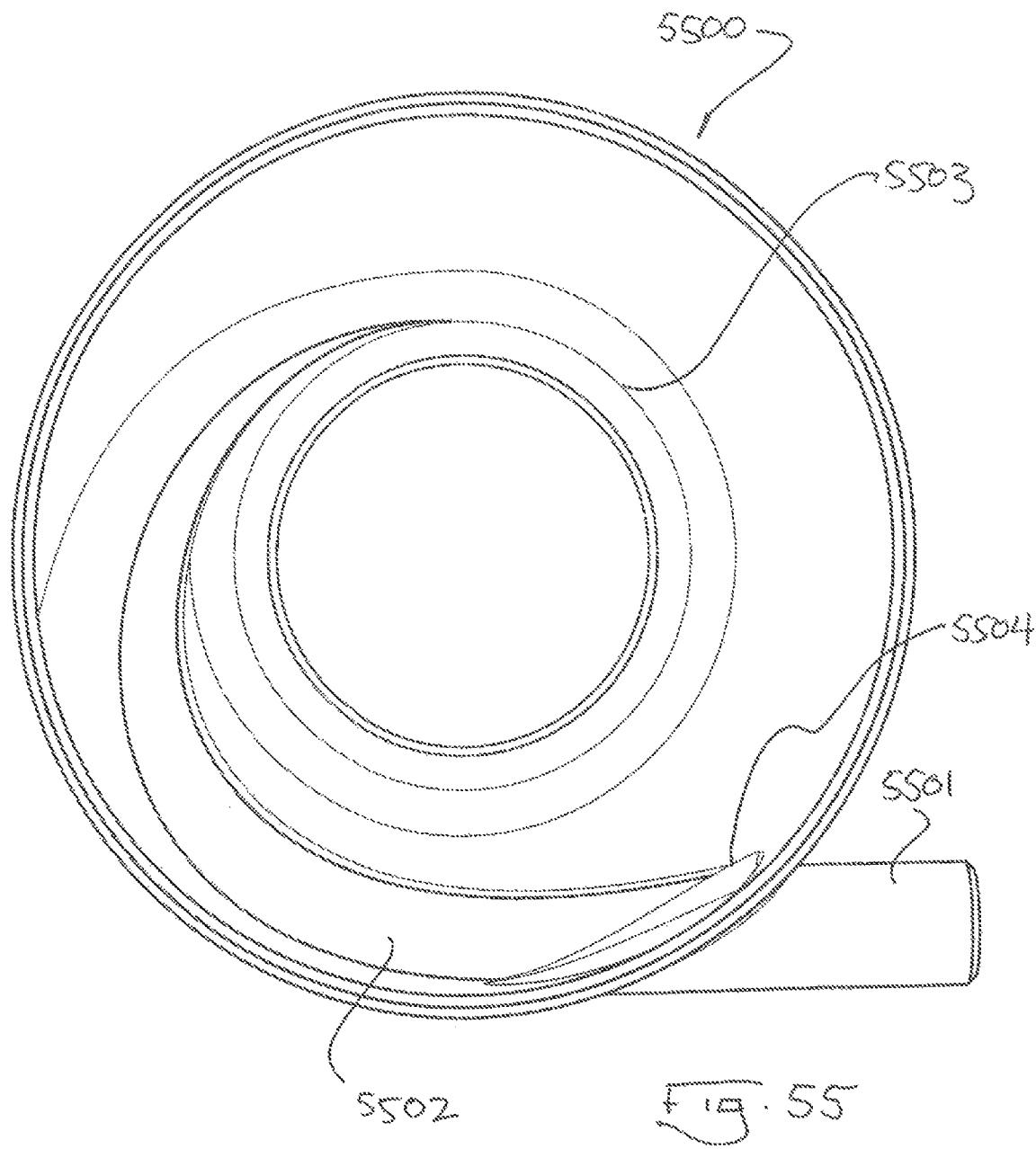
FIG. 55 is a top plan view of a juice collector having an internal helical ramp and tangential discharge nozzle.

As shown in FIG. 55, a juice collector 5500 may combine the features of a tangentially oriented discharge nozzle 5501 with a helical ramp 5502 of the kind disclosed with reference to FIGS. 46-49. In this example, the ramp 5502 extends from the floor or lowest part of the interior of the juice collector 5503 to the entry opening 5504 of the nozzle 5501. As such, juice travelling along the ramp 5502 will enter the nozzle 5501 longitudinally rather than transversely as shown, for example, in FIGS. 46 and 48.

Figure 56:
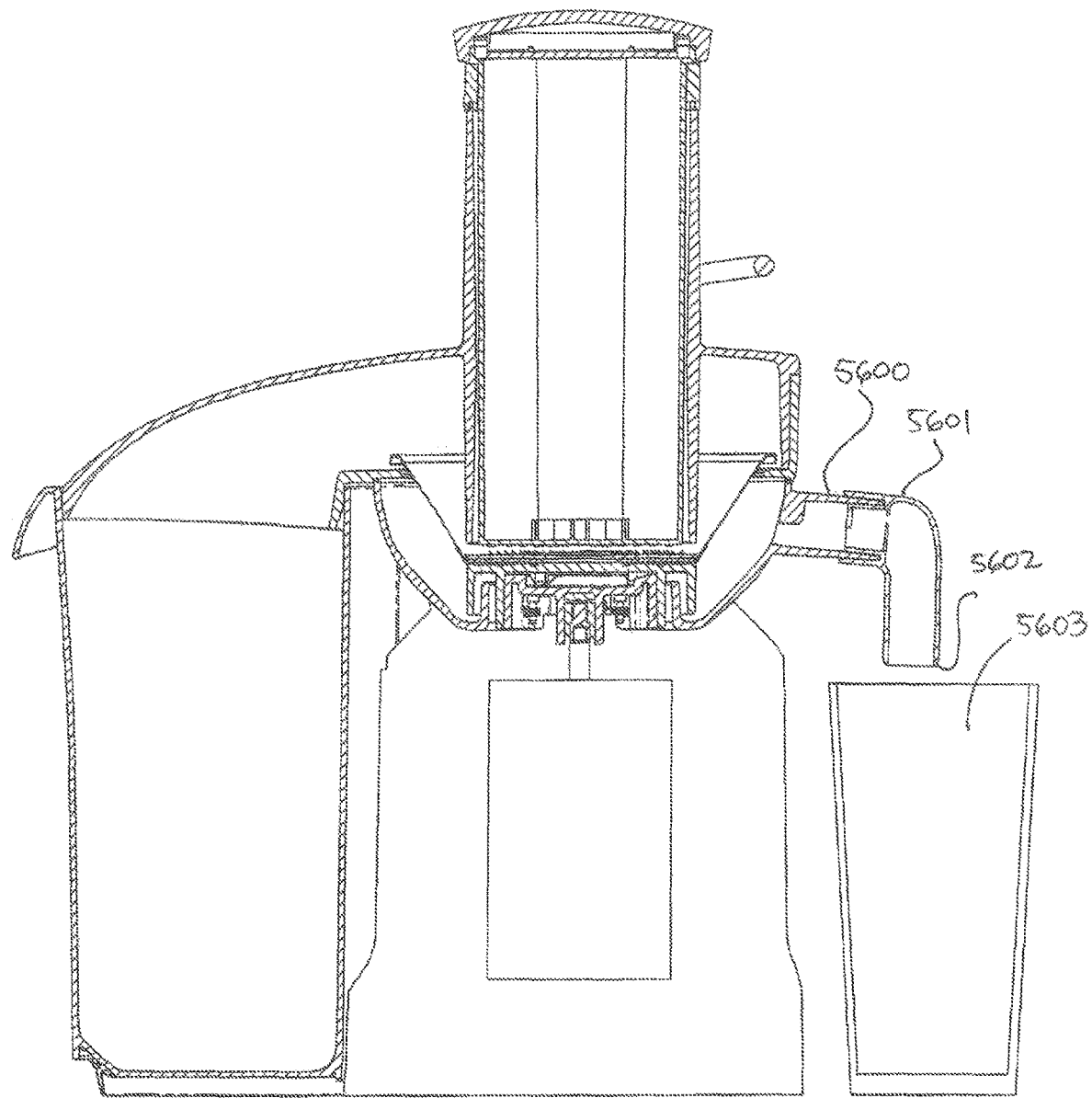
FIG. 56 is a cross sectional view of a centrifugal fruit and vegetable juicing having an auxiliary nozzle.
Figure 57:
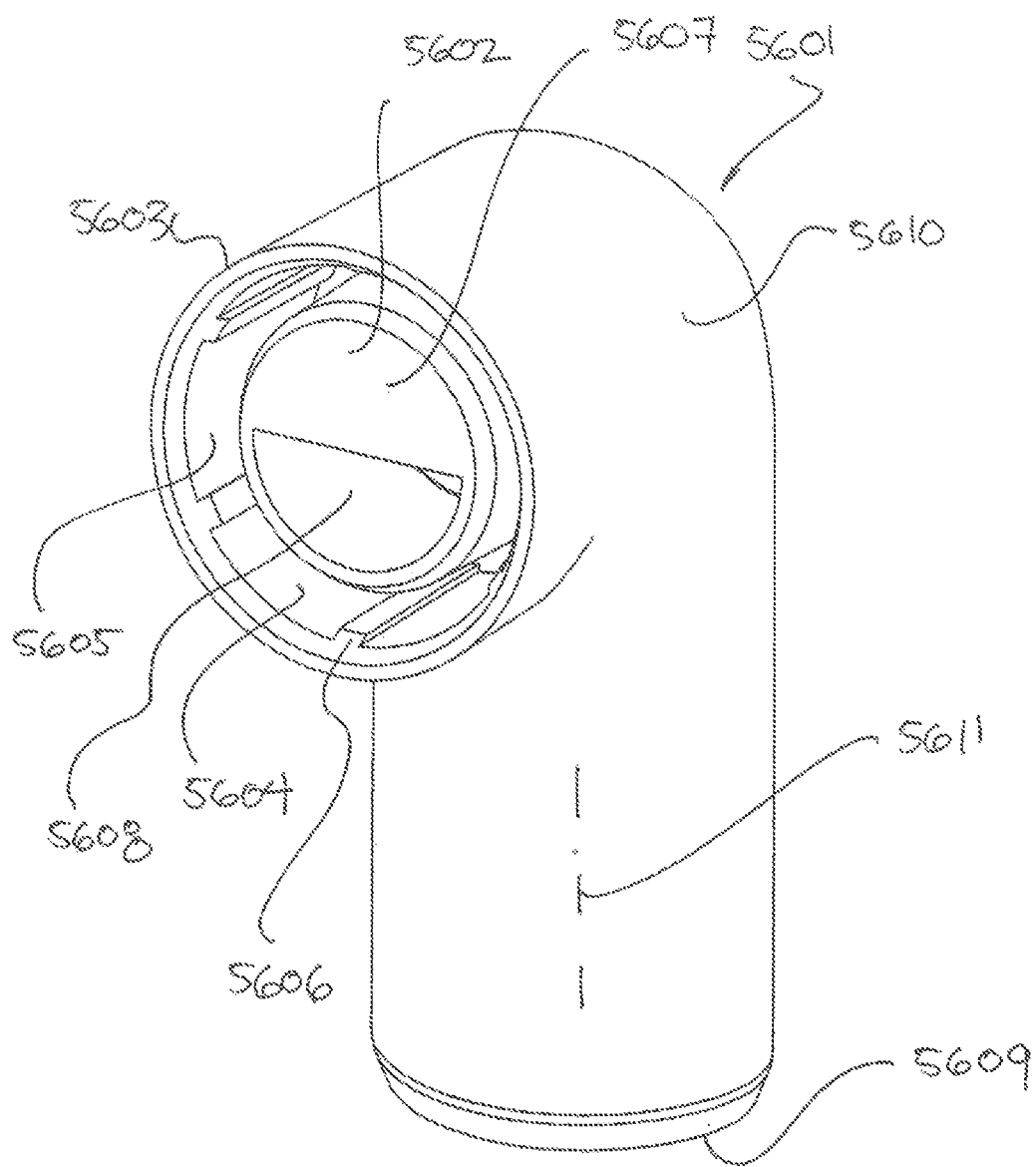
FIG. 57 is a perspective view of the auxiliary nozzle shown in FIG. 56.

As shown in FIGS. 56 and 57, a discharge nozzle 5600 may removably carry an auxiliary nozzle 5601. The auxiliary nozzle 5601 is preferably formed from an elastomeric polymer so that it can be affixed to and removed from the juice collector's nozzle 5600 without tools. Particularly where the exit velocity of extracted juice and air is high, the auxiliary nozzle 5601 acts to introduce turbulence in the air flow and slow the exit speed of the juice as well as altering its direction. As shown in FIG. 56, the auxiliary nozzle 5601 is generally "L" shaped, having a downwardly directed discharge opening 5602 ideal for filling a glass 5603.

As shown in FIG. 57, the auxiliary nozzle 5601 comprises an inlet plug portion 5602 that is surrounded by an outer cuff 5603. A circumferential groove 5604 is thus formed between the collar 5603 and plug 5602. In this example, the outside wall of the groove 5605 is provided with an array of longitudinal ribs 5606. The groove 5604 fits over the end of a juice collectors' nozzle and the ribs 5606 provide additional purchase and friction for the purpose of better retaining the auxiliary nozzle onto the juicer's primary nozzle 5600. In this example, the maximum cross sectional area of the intake plug 5602 is partially occluded by a baffle 5607. The baffle occupies approximately the upper half of the maximum available cross sectional opening of the plug, thus creating a generally semi-circular lower opening 5608 through which juice can flow into the auxiliary nozzle and out of the discharge opening 5609. The change in direction caused h the bend 5610 in the shape and flow path of the nozzle slows the exit speed of the juice. Reducing the surface area of the intake opening with a baffle 5607 also slows the exit speed of the juice from the nozzle. In preferred embodiments, the longitudinal axis 5611 of the lower part of the auxiliary nozzle is vertical and the exit opening 5609 is perpendicular to that axis 5611. This provides for a generally vertical discharge of juice. Vertical discharge is particularly useful when as user is discharging extracted juice into a glass, cup or mug with an open top.

It will be appreciated that in previous examples of a juice collector incorporating helical or spiral ramps that one or more grooves in the interior surface of the juice collector may be used in place of a ramp. The interior surface of the juice collector may also be wholly or partially coated with a non-stick surface such as a fluoro-polymer (PTFE) or silicone or a Sol-Gel coating if the juice collector is metallic.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

What is claimed is:

1. A fruit and vegetable juicing device, the device comprising:
   a feed tube below which is located a grating disc and frusto-conical sieve, and wherein:
   the grating disc has a first array of discrete teeth, each tooth in the first array having a front edge, the front edge comprising an inner edge, an outer edge and an apex between the inner edge and the outer edge; each tooth in the first array having a circle of rotation passing through the apex; and each tooth in the first array having a longitudinal axis passing through the apex that is inclined with respect to the circle of rotation in a plane of the circle of rotation, such that one of the inner edge and the outer edge provides a leading edge and the other provides a trailing edge.

2. The device of claim 1, wherein:
the grating disc has a primary processing surface having an effective radius that is about the same as an inner radius of the feed tube and a secondary processing surface is radially outward of the primary processing surface;
a lower end of the feed tube forming a throttling surface;
the secondary processing surface and the throttling surface forming a throttling channel.

3. The device of claim 2, wherein:
the throttling channel is frusto-conical.

4. The device of claim 3, wherein:
the throttling channel is directed generally perpendicular to the sieve.

5. The device of claim 4, wherein:
the secondary processing surface comprises a second array of grating teeth.

6. The device of claim 5, wherein:
each tooth in the second array having a front edge, the front edge comprising an inner edge, an outer edge and an apex between the inner edge and the outer edge;
each tooth in the second array having a second circle of rotation, the second circle of rotation passing through an apex of each tooth in the second array;
each tooth in the second array having a longitudinal axis passing through the apex that is inclined with respect to the second circle of rotation, wherein each tooth in the second array has a leading edge and a trailing edge.

7. The device of claim 2 wherein:
the throttling surface extends radially outward from an outer surface of the feed tube.

8. The device of claim 7, wherein:
the throttling surface extends both radially outward and down.

9. The device of claim 2, wherein:
the teeth of the first array are formed in first rows; and
the secondary processing surface comprises a second array of grating teeth.

10. The device of claim 9, wherein:
the second array of grating teeth is formed in second rows that are angularly offset from the first rows.

11. The device of claim 9, wherein:
the second array is formed in rows that are co-linear with the first rows.

12. The device of claim 9, wherein:
the second array is formed in rows that are angled with respect to the first rows.

13. The device of claim 9, wherein: the second array is formed in rows that are staggered with respect to the first rows.

14. The device of claim 9, wherein:
the first array and the second array are formed in rows; and
there are three rows in the second array of each row in the first array.

15. The device of claim 1, wherein:
the first array of teeth is formed in rows, each row extending to an outer tooth that is adjacent to a perimeter of the grating disc;
the grating disc comprising interstitial teeth located between the rows and adjacent to the perimeter.

16. The device of claim 1, wherein the inner edge is the leading edge in said direction relative to said outer edge.

17. The device of claim 1, wherein the outer edge is the leading edge in said direction relative to said inner edge.

18. The device of claim 1, wherein an indentation is formed into an upper surface of the grating disc adjacent each tooth in the first array, the indentation forming a recess in a front face of the tooth, the indentation further forming a pocket, the pocket being disposed below and in front of the front face of the tooth.

19. The device of claim 1, wherein each tooth in the first array of teeth is in a different radial plane of the grating disc.

20. A fruit and vegetable juicing device, comprising:
a feed tube below which is located a grating disc and frusto-conical sieve;
wherein the grating disc has a first array of teeth, each tooth in the first array having a front edge comprising an inner edge, an outer edge, and an apex disposed between the inner edge and the outer edge;
each tooth in the first array disposed along a circle of rotation that passes through the apex;
an indentation formed into an upper surface of the grating disc adjacent each tooth in the first array, the indentation forming a recess in a front face of the tooth, the indentation further forming a pocket below and in front of the front face of the tooth; and
each tooth in the first array having a longitudinal axis that passes through the apex that is inclined with respect to the circle of rotation, such that one of the inner edge and the outer edge provides a leading edge and another one of the inner edge and the outer edge provides a trailing edge.

21. The device of claim 20, wherein the longitudinal axis that passes through the apex that is parallel to a plane of rotation of the grating disc.

\* \* \* \* \*